(12) United States Patent
Singh et al.

(10) Patent No.: US 12,093,603 B2
(45) Date of Patent: Sep. 17, 2024

(54) DYNAMICALLY ADJUSTING A PERSONAL BOUNDARY OF AN AVATAR IN AN XR ENVIRONMENT

(71) Applicant: Rovi Guides, Inc., San Jose, CA (US)

(72) Inventors: Gyanveer Singh, Bangalore (IN); Dhananjay Lal, Englewood, CO (US); Reda Harb, Issaquah, WA (US); Kyle Beckemeyer, Park Ridge, IL (US)

(73) Assignee: Rovi Guides Inc., San Jose, CA (US)

( * ) Notice: Subject to any disclaimer, the term of this patent is extended or adjusted under 35 U.S.C. 154(b) by 36 days.

(21) Appl. No.: 17/941,489

(22) Filed: Sep. 9, 2022

(65) Prior Publication Data

US 2024/0086142 A1 Mar. 14, 2024

(51) Int. Cl.
*G06F 3/16* (2006.01)
*G06F 18/00* (2023.01)
(Continued)

(52) U.S. Cl.
CPC .............. *G06F 3/165* (2013.01); *G06F 18/00* (2023.01); *G06F 40/166* (2020.01); *G06T 13/40* (2013.01); *G06T 19/00* (2013.01); *G10L 15/18* (2013.01); *G10L 25/63* (2013.01); *G06T 2219/024* (2013.01)

(58) Field of Classification Search
CPC ....... G06T 19/006; G06T 13/40; G06T 19/00; G06T 2219/024; G06F 3/165; G06F 18/00; G06F 40/166; G06F 40/253; G06F 3/167; G10L 15/18; G10L 25/63; G06V 10/94; G06V 20/20; G06V 40/20; G06V 10/95

See application file for complete search history.

(56) References Cited

U.S. PATENT DOCUMENTS 11,043,219 B1 * 6/2021 Walters ................. G10L 21/013
2015/0070516 A1 * 3/2015 Shoemake ......... H04N 21/4542
348/207.11

(Continued)

OTHER PUBLICATIONS

"Graph API", https://developers.facebook.com/docs/graph-api, retrieved on Aug. 24, 2022.

(Continued)

*Primary Examiner* — Maurice L. McDowell, Jr.
*Assistant Examiner* — Donna J. Ricks
(74) *Attorney, Agent, or Firm* — Haley Guilliano LLP

(57) ABSTRACT

Systems and methods are provided for dynamically adjusting a personal boundary of an avatar in an XR environment. The system identifies a first avatar in an extended reality (XR) environment based on rule data stored in a storage. In response to the system detecting that the first avatar has entered a portion of the XR environment at a communicable distance from a second avatar, the system does the following steps. The system determines an offensiveness rating of the first avatar. The system retrieves, from the storage, an offensiveness tolerance of the second avatar. The system compares the offensiveness rating of the first avatar and offensiveness tolerance of the second avatar. In response to determining, based on the comparing, that the offensiveness rating of the first avatar exceeds the offensiveness tolerance of the second avatar, the system automatically censors one or more messages from the first avatar to the second avatar.

21 Claims, 14 Drawing Sheets

(51) Int. Cl.
*G06F 40/166* (2020.01)
*G06T 13/40* (2011.01)
*G06T 19/00* (2011.01)
*G10L 15/18* (2013.01)
*G10L 25/63* (2013.01)

(56) References Cited

U.S. PATENT DOCUMENTS

| | | | | |
|---|---|---|---|---|
| 2016/0300388 | A1* | 10/2016 | Stafford | A63F 13/69 |
| 2019/0221045 | A1* | 7/2019 | Li | G06T 19/006 |
| 2022/0284735 | A1* | 9/2022 | Zavesky | A63F 13/33 |
| 2023/0351098 | A1* | 11/2023 | Liu | G06F 40/166 |

OTHER PUBLICATIONS

"The Metaverse's dark side: Here come harassment and assaults", New York Times, Sep. 9, 2022.

"Users, Friends, and Relationships", https://developer.oculus.com/documentation/native/ps-presence/, retrieved on Aug. 24, 2022.

Anonymous, "Personal Boundaries in Virtual Reality", Technical Disclosure Commons, https://www.tdcommons.org/dpubs_series/3588, Sep. 9, 2020.

Chittaro, Luca, et al., "A Visual Tool for Tracing Users' Behavior in Virtual Environments", DOI: 10.1145/989863.989868, Jan. 2004, 1-8.

Hutchinson, Andrew, "Meta Adds New 'Mature' Content Classifications for Horizon Worlds", Social Media Today, www.socialmediatoday.com/news/meta-adds-new-mature-content-classifications-for-horizon-worlds/627961/, retrieved on Aug. 10, 2022, Jul. 22, 2022.

Kose, Ahmet, et al., "Dynamic Predictive Modeling Approach of User Behavior in Virtual Reality Based Application", 27th Mediterranean Conference on Control and Automation (MED), Akko, Israel, Jul. 1-4, 2019.

McMillin, David, "Social Distancing Solution: Wristbands Do the Talking for Attendees", https://www.pcma.org/social-distancing-solution-wristbands-attendees/, retrieved on Aug. 24, 2022, Jun. 25, 2020.

Molina, Brett, "A 'personal boundary' in the metaverse: Talking Tech podcast", USA Today, https://www.usatoday.com/story/tech/2022/02/05/personal-boundary-metaverse-talking-tech-podcast/6674577001/, retrieved on Aug. 24, 2022, Feb. 5, 2022.

Nguyen, Nhung, et al., "Modeling Peripersonal Action Space for Virtual Humans by Learning a Tactile Body Schema", KI (2009), 1-9.

Paliokas, Ioannis, et al., "Study of Users' Behaviour in Virtual Reality Environments", The International Journal of Technology Knowledge and Society 4(1):121-132, Jan. 2008.

Sharma, Vivek, "Introducing a Personal Boundary for Horizon Worlds and Venues", https://www.oculus.com/blog/introducing-a-personal-boundary-for-horizon-worlds-and-venues/, retrieved on Aug. 24, 2022, Mar. 14, 2022.

* cited by examiner

800

```
COMPARE IDENTIFICATION DATA OF THE FIRST AVATAR
TO ENTRIES OF A PERSONALIZED LIST OF BAD ACTOR     802
AVATARS STORED IN THE STORAGE IN ASSOCIATION WITH
THE SECOND AVATAR
            ↓
DETERMINE THAT THE IDENTIFICATION DATA OF THE
FIRST AVATAR MATCHES AN ENTRY IN THE               804
PERSONALIZED LIST
```

```
ANALYZE INTERACTION DATA REPRESENTING A
STATEMENT OR GESTURE MADE BY THE FIRST AVATAR IN   902
THE XR ENVIRONMENT
            ↓
DETERMINE THAT THE INTERACTION DATA INCLUDES USE   904
OF ABUSIVE OR AGGRESSIVE LANGUAGE OR GESTURE
```

| ANALYZE INTERACTION DATA REPRESENTING A REACTION OF ANOTHER AVATAR TO A STATEMENT OR GESTURE MADE BY THE FIRST AVATAR IN THE XR ENVIRONMENT | 1002 |

↓

| DETERMINE THAT THE INTERACTION DATA INDICATES THE FIRST AVATAR USED ABUSIVE OR AGGRESSIVE LANGUAGE OR GESTURE | 1004 |

FIG. 10

DYNAMICALLY ADJUSTING A PERSONAL BOUNDARY OF AN AVATAR IN AN XR ENVIRONMENT

BACKGROUND

This disclosure is directed to systems and methods for enhancing a user's experience in an extended reality (XR) environment (e.g., augmented reality, (AR), virtual reality (VR), and mixed reality (MR) environment), and in particular providing a personal boundary for an avatar in an XR environment.

SUMMARY

Advancements in XR technology enabled the metaverse, an XR world where people's movements and interactions are transferred to their avatars, enabling people to do everything virtually, from playing video games and attending gym classes to participating in meetings. However, the metaverse faces challenges in controlling harassment, assaults, bullying, and hate speech which already run rampant in VR games, which are part of the metaverse. Bad behavior in the metaverse can be more severe than today's online harassment and bullying because XR places people in an immersive digital environment where unwanted touches in the digital world can be made to feel real and the sensory experience is heightened. The XR world may be vast, with an immense number of users, and constantly monitoring users in an XR environment to keep it harassment-free can take a large amount of computing resources. Additionally, to enhance user experience, users in an XR environment may prefer to not provide manual user input or intervention to control personal boundaries. A flexible solution that dynamically provides personal boundaries for avatars in virtual platforms is desired.

The present disclosure addresses the problems described above, by, for example, providing systems and methods for dynamically setting and/or adjusting personal boundaries for avatars and/or warning zones around avatars, and automatically censoring avatars in an XR environment. In some embodiments, the described systems determine that a first avatar is sufficiently offensive and sufficiently proximate to a second avatar to warrant censoring messages (e.g., from the perspective of a user associated with the second avatar) from the first avatar that might otherwise be received by a user associated with the second avatar. In some instances, the first avatar may be referred to as a "bad actor" and the second avatar may be referred to as the "recipient" who may receive a message (e.g., censored) from the bad actor.

In some embodiments, a computer system (e.g., using an XR application) identifies the first avatar or bad actor in an extended reality (XR) environment based on rule data stored in a storage. Rule data may comprise rules that identify an avatar as having bad behavior in an XR environment. For example, a rule that identifies bad behavior may be use of language that include swear words, derogatory terms, abusive language, aggressive language, etc. A rule may be use of aggressive or abusive gestures (e.g., pointing, hitting, punching, flipping someone off, kicking, etc.). A rule may be that an avatar is on a personal bad actor list of another avatar (e.g., personalized blocklist).

In response to the system detecting that the first avatar or bad actor has entered a portion of the XR environment at a communicable distance from the second avatar or recipient, the system may perform the following steps in the paragraphs below. The communicable distance may be a distance at which an avatar (e.g., the second avatar or recipient) can detect or receive messages from another avatar (e.g., the first avatar or bad actor). The communicable distance may be based on user input preference data stored in storage in association with the second avatar. For example, a user of the second avatar may set the communicable distance for the second avatar. The communicable distance may be based on contextual data stored in the storage in association with a zone (e.g., region in an XR environment). For example, the communicable distance may be set by what type of room the user or avatar is in. The communicable distance for a meeting room may be larger than a communicable distance in a cafeteria. For example, a meeting room generally includes people that are meeting for a specific purpose to communicate and may be easier for persons to communicate over larger distances. A cafeteria may indicate a smaller communicable distance because there may be multiple conversations going on in the cafeteria.

In response to the system detecting that the first avatar or bad actor has entered a portion of the XR environment at a communicable distance from the second avatar or recipient, the system may determine an offensiveness rating of the first avatar or bad actor. The offensiveness rating may be a rating associated with an avatar (e.g., the first avatar) based on either (i) cumulative behavior or (ii) a single action/gesture/speech. For example, the offensiveness rating may be determined based on cumulative behavior such as a number of rules an avatar has violated. The offensiveness rating may be based on a weighted average of the rules the avatar has violated. The weighted average may vary with severity of the violation, or may vary with more recent violations being weighted more heavily than older violations. In another example, the offensiveness rating may be determined based on a single action/gesture/speech such as a single instance of swearing. The offensiveness rating may be represented by a letter grade of A-F (e.g., "A" indicating very offensive and "F" indicating not offensive). The offensiveness rating may be represented by a score on a scale of 1-100 (e.g., 1 being the least offensive and 100 being the most offensive). In some embodiments, the offensiveness rating of the first avatar is tied to a user ID (and thus a particular user) of the first avatar. For example, a user associated with the user ID may utilize other avatars in some instances, and each may have the same offensiveness rating. In such embodiments, the offensiveness rating may account for the aggregate behaviors of the various avatars tied to the user ID. In some embodiments, the offensiveness rating is tied to the first avatar and not other avatars owned or used by the user associated with the first avatar. For example, a user ID for the user of the first avatar may be linked to numerous avatars or characters, each of which may have its own offensiveness rating.

In response to the system detecting that the first avatar or bad actor has entered a portion of the XR environment at a communicable distance from the second avatar or recipient, the system may retrieve, from the storage, an offensiveness tolerance of the second avatar or recipient. An offensiveness tolerance may be a level of offensiveness that a user of an avatar (e.g., the second avatar) can tolerate. For example, an offensiveness tolerance may be represented by a score on a scale of 1-100 (e.g., 1 indicating a lowest tolerance for offensiveness, and 100 indicating the highest tolerance for offensiveness). An offensiveness tolerance may be represented by a letter grade of A-F (e.g., "A" indicating highest tolerance for offensive behavior, and "F" indicating lowest tolerance for offensive behavior). In some embodiments, the offensiveness tolerance is based on user input preference data stored in storage in association with an avatar. For example, the user input preference data may be generic, and a user of an avatar may input a tolerance for offensive language/behavior on a sliding scale of 1-100 as the user input preference data. In some embodiments, the user input preference data may be or include a personal blocklist including specific behaviors and/or words. For example, the user of an avatar may input a list of specific behaviors and/or words on the personal blocklist that he or she wishes to avoid. In some embodiments, the offensiveness tolerance of the second avatar is tied to a user ID (and thus a particular user) of the second avatar. In some embodiments, the offensiveness tolerance is tied to the second avatar and not other avatars owned or used by the user associated with the second avatar. For example, a user ID for the user of the second avatar may be linked to numerous avatars or characters, each of which may have its own offensiveness tolerance. In some embodiments, the offensiveness tolerance for the second avatar may be a region-wide or a community-wide tolerance that applies for any avatar that happens to be in the region or community (e.g., the second avatar). In some instances, the offensiveness tolerance for the second avatar may be partially or completely tailored to the second avatar/user. In some instances, the offensiveness tolerance may be binary in nature, and may be automatically or manually set to "off" in some circumstances (e.g., for users having a high tolerance for offensive behavior). As an example, setting the offensiveness tolerance to "off" may indicate a highest tolerance for offensiveness (e.g., score of "100" or letter grade of "A").

In response to the system detecting that the first avatar or bad actor has entered a portion of the XR environment at a communicable distance from the second avatar or recipient, the system may compare the offensiveness rating of the first avatar or bad actor and offensiveness tolerance of the second avatar or recipient. For example, the first avatar may have an offensiveness rating of "A" and the offensiveness tolerance of the second avatar is "B." In response to determining, based on the comparing, that the offensiveness rating of the first avatar exceeds the offensiveness tolerance of the second avatar, the system may automatically censor messages from the first avatar to the second avatar. Continuing with this example, the first avatar having an offensiveness rating of "A" exceeds the offensiveness tolerance of "B" of the second avatar. The system may automatically censor one or more messages from the first avatar to the second avatar. In an embodiment, when other avatars are proximate to the first or second avatars, messages from the first avatar are also censored from the perspective of the other avatars. For example, the second avatar and the other avatars may be in a group (e.g., with a dedicated communication channel for the group), and the messages may be censored for the entire group. In an embodiment, a different analysis is conducted for each member of the group. If desired, messages may be censored for the entire group based on the most sensitive offensiveness tolerance in the group. In some embodiments, censoring for a given avatar does not account for the offensiveness tolerance of others in the area.

Automatically censoring one or more messages may be performed by censoring verbal or text information. For example, the system may automatically censor verbal information by muting audio, decreasing volume of audio, and replacing audio (e.g., bleeping/alternative audio). The system may automatically censor text information may by automatically preventing the display of textual representation of a message or replacing text of a textual message with wildcards. In an embodiment, the logic for the censoring is executed by an end-user device, by a server providing the XR environment, or by some combination thereof.

In one aspect, the system may compare identification data of the first avatar to entries of a personalized list of bad actors (e.g., users or avatars identified as having bad behavior, being aggressive, being unfriendly, etc.) stored in the storage in association with the second avatar. The system may determine that the identification data of the first avatar matches an entry in the personalized list. The identification data of the first avatar may be a user ID that is a user handle, or a unique ID tied to the avatar (e.g., not tied to the user). The personalized list may be manually curated by the user of an avatar. The system may automatically curate the personalized list associated with an avatar based on observations of historical interactions (e.g., observing the bad actor avatar and the user's response to the bad actor avatar). The personalized list may be a combination of a manually curated list by the user of an avatar, and a list that was automatically curated by the system based on observations of historical interactions.

In one embodiment, the system may analyze interaction data representing a statement or gesture made by the first avatar or bad actor in the XR environment. The system may determine that the interaction data includes use of abusive or aggressive language or gesture. Interaction data may include audio data or text message of an avatar making a statement. Interaction data may include a gesture performed by an avatar. The system may determine that the interaction data includes use of abusive or aggressive language or gesture by comparing the language or gesture to a language or gesture blocklist. The blocklist may be predefined, may be constantly updated, or may be edited by a user of an avatar. For example, a predefined language blocklist may include generally offensive words such as swear words, derogatory terms, abusive language, aggressive language, etc. A predefined gesture blocklist may include generally offensive gestures such as pointing, hitting, punching, flipping someone off, kicking, etc. The system may constantly update the blocklist by learning new words/gestures that are offensive based on feedback from other users/avatars of the XR world. A user of an avatar may edit the blocklist to include words or gestures that are specifically offensive to the user of the avatar. The blocklist may be a personalized blocklist of the user to only include words or gestures found offensive by the user.

In one embodiment, the system may analyze interaction data representing a reaction of another avatar to a statement or gesture made by the first avatar in the XR environment. The system may determine that the interaction data indicates the first avatar used abusive or aggressive language or gesture. In one aspect, the system may analyze the interaction data by using natural language processing for verbal statement analysis. The system may analyze the interaction data by using gesture analysis.

As an example, the first avatar may be a 3D model for a given user. A single user may have multiple different avatars. In some embodiments, the first avatar is one of a plurality of avatars for a first user ID, and the second avatar is for a second user ID. In response to determining that the offensiveness rating of the first avatar exceeds the offensiveness tolerance of the second user ID, the system may automatically censor one or more messages from any of the plurality of avatars for the first user ID to the second avatar of the second user ID. In other embodiments, in response to determining that the offensiveness rating of the first avatar exceeds the offensiveness tolerance of the second user, the system may not automatically censor messages from others of the plurality of avatars for the first user ID.

In some embodiments, the portion of the XR environment includes multiple sub-portions with varying tolerance levels. For each of these sub-portions, the system may censor messages from a bad actor differently. For example, when a bad actor is within an outer zone, layer, or sub-portion of the portion, the bad actor may be silenced completely from the perspective of the recipient. When the bad actor enters a layer, zone, or sub-portion more proximate to the recipient (sometimes referred to as a more inner layer), the bad actor may be censored in a different manner. For example, rather than being completely silenced, a portion of the bad actor's behaviors, gestures, or messages may be received by the recipient (e.g., such that non-offensive portions of messages are received). In some instances, while in one of the more inner layers, the bad actor may be censored or silenced, but the recipient may be notified that the bad actor is speaking.

In an embodiment, responsive to determining that the first avatar entered a first sub-portion corresponding to an outer zone within the portion, the system may mute all audio from the first avatar without indicating that the first avatar is speaking. In some embodiments, the system prevents any communication from the first avatar from being received by a second avatar without indicating the first avatar is communicating. For instance, the second avatar may be aware of the presence of the first avatar in the first sub-portion corresponding to the outer zone, but the second avatar may not receive any communication from the first avatar (e.g., not receive audio or text messages from the first avatar with no indication that the first avatar is speaking or sending a text message). Responsive to determining that the first avatar entered a second sub-portion corresponding to an inner zone within the portion, the system may mute all audio from the first avatar while indicating that the first avatar is speaking. For example, an inner zone may be a personal boundary inside a communicable zone (e.g., within a communicable distance from the avatar). When an avatar is in an outer zone, the system may fully mute or silence the avatar. For example, the system may prevent all communication from the first avatar from being received by the second avatar (e.g., the first avatar being in an outer zone may indicate the first avatar is not trying to communicate with the second avatar). When an avatar is in an inner zone or zones (e.g., within the personal boundary zone), the system may censor differently relative to the outer zone(s) (e.g., indicate that the avatar is speaking while muting, or censor only the bad language). For example, the system may indicate the first avatar is speaking or writing messages to the second avatar but muting the speech or replacing written communication with other text indicators (e.g., the first avatar in an inner zone or zones may indicate the first avatar is trying to communicate with the second avatar). Alternatively, the system may indicate the avatar is speaking or writing messages to the user by only censoring the bad language in the spoken or written text (e.g., replacing bad language with other audio or silence, or other text indicators). Bad language may be language that includes generally offensive words such as swear words, derogatory terms, abusive language, aggressive language, etc. Bad language may be language on a blocklist that may be predefined, constantly updated, or edited by a user of an avatar. The system may constantly update the blocklist by learning new words that are offensive based on feedback from other users/avatars of the XR world. A user of an avatar may edit the blocklist to include words that are specifically offensive to the user of the avatar. The blocklist may be a personalized blocklist of the user to only include words found offensive by the user. The system may prompt the second avatar to take multiple actions when the first avatar is within any desired zone (e.g., an inner zone). For example, a user of the second avatar may be prompted with an option to fully mute or silence the first avatar; an option to "disappear" the first avatar so that the user no longer sees the bad actor; an option to "kick" the first avatar to a region outside the personal boundary, etc.

In some embodiments, the system may, in response to determining, based on the comparing, that the offensiveness rating of the first avatar exceeds the offensiveness tolerance of the second avatar, automatically censor messages from the first avatar to the second avatar and provide a first option for the second avatar to mute all audio from the first avatar without indicating that the first avatar is speaking, a second option for the second avatar to disappear the first avatar such that the second avatar no longer sees the first avatar, and a third option to move the first avatar to a region outside a personal boundary of the second avatar.

In some embodiments, the system includes control circuitry configured to identify a first avatar or bad actor in an extended reality (XR) environment based on rule data stored in a storage, and in response to detecting that the first avatar has entered a portion of the XR environment at a communicable distance from a second avatar: determine an offensiveness rating of the first avatar. The control circuitry may be configured to retrieve, from the storage, an offensiveness tolerance of the second avatar or recipient, compare the offensiveness rating of the first avatar and the offensiveness tolerance of the second avatar, and in response to determining, based on the comparing, that the offensiveness rating of the first avatar exceeds the offensiveness tolerance of the second avatar, automatically censor one or more messages from a first device of the first avatar to a second device of the second avatar. The second device may be configured to provide the automatically censored one or more messages via an XR interface for the XR environment. In some embodiments, the second device may be a virtual reality (VR) headset. The VR headset may have optical see-through functionality and/or video see-through functionality. The VR headset of the recipient may display real-world objects as well as virtual world environment and objects. In some embodiments, a bad actor (e.g., first avatar) may enter the XR environment via a browser, and the first device may be a personal computer, smartphone, tablet, or any suitable device.

In some embodiments, the first avatar is one of a plurality of avatars for a first user ID and the second avatar is one of one or more avatars for a second user ID. The control circuitry may be further configured to automatically censor messages from any of the plurality of avatars for the first user ID to any of the one or more avatars for the second user ID in response to the determining that the offensiveness rating of the first avatar exceeds the offensiveness tolerance of the second avatar.

In some embodiments, the portion of the XR environment includes multiple sub-portions. Each sub-portion may be associated with a corresponding tolerance level. The control circuitry may be further configured to, responsive to determining that the first avatar entered a first sub-portion corresponding to an outer zone within the portion, mute all audio from the first avatar without indicating that first avatar is speaking. The control circuitry may be further configured to, responsive to determining that the first avatar entered a second sub-portion corresponding to an inner zone within the portion, mute all audio from the first avatar while indicating that the first avatar is speaking.

In some embodiments, the system may tag a virtual zone based on recent activity, conversation, gesture, etc. The system may dynamically associate context information/tags to a particular zone based on analysis of real-time and past conversations, or gestures used within the particular zone. The system may allow adjustment of the personal boundary/warning zone based on dynamically associated context information/tag. The system may provide enhanced safety by adjusting personal boundary/warning zone based on active analysis of user activity/behavior/responsive gesture/conversation. The system may provide a recommendation/alert to set a suitable personal boundary. The system may increase a virtual zone space based on the number of avatars present and their respective personal boundaries.

In some embodiments, the system addresses other types of discomforts (e.g. someone approaching from the back side) and harassment (e.g., verbal) in the XR world. The system may be flexible and provide an irregularly shaped personal boundary, and may provide a different range for a warning zone for different directions (e.g., control parameter for the back side warning zone may be more strict) and can also blend with a playable region boundary set for the physical space. The system may enable audio blocking/microphone muting.

In some embodiments, the system may auto police. The system may enable auto policing in the cyber environment. The system may generate a notification or alert the avatar through audio notification or haptic feedback about an intruder in proximity. The system may indicate a degree of violation based on audio and haptic feedback. The system may graduate or ramp up the notifications. Each time an avatar violates the personal boundary of other avatars even after the notification is generated, the system may analyze the type of gesture, verbal statement, degree of violation, etc., and attach a penalty score. The system may recommend safe navigation based on the predicted encounter of intruder avatars. Through the active data analysis, the system may provide, through haptic or audio signal, a social clue/vibe to avatars, similar to how human senses may help a user in the physical environment.

As a result of the use of these techniques, dynamically setting and/or adjusting personal boundaries for avatars and/or warning zones around avatars, and automatically censoring avatars in the immersive environment is enabled.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 8 is a flowchart of a detailed illustrative process for identifying a first avatar in an XR environment based on a personalized list of bad actor avatars, in accordance with some embodiments of this disclosure.

FIG. 9 is a flowchart of a detailed illustrative process for identifying a first avatar in an XR environment based analyzing interaction data representing a statement or gesture made by the first avatar, in accordance with some embodiments of this disclosure.

FIG. 10 is a flowchart of a detailed illustrative process for identifying a first avatar in an XR environment based on interaction data representing a reaction of another avatar to a statement or gesture made by the first avatar, in accordance with some embodiments of this disclosure.

DETAILED DESCRIPTION

Figure 1A:
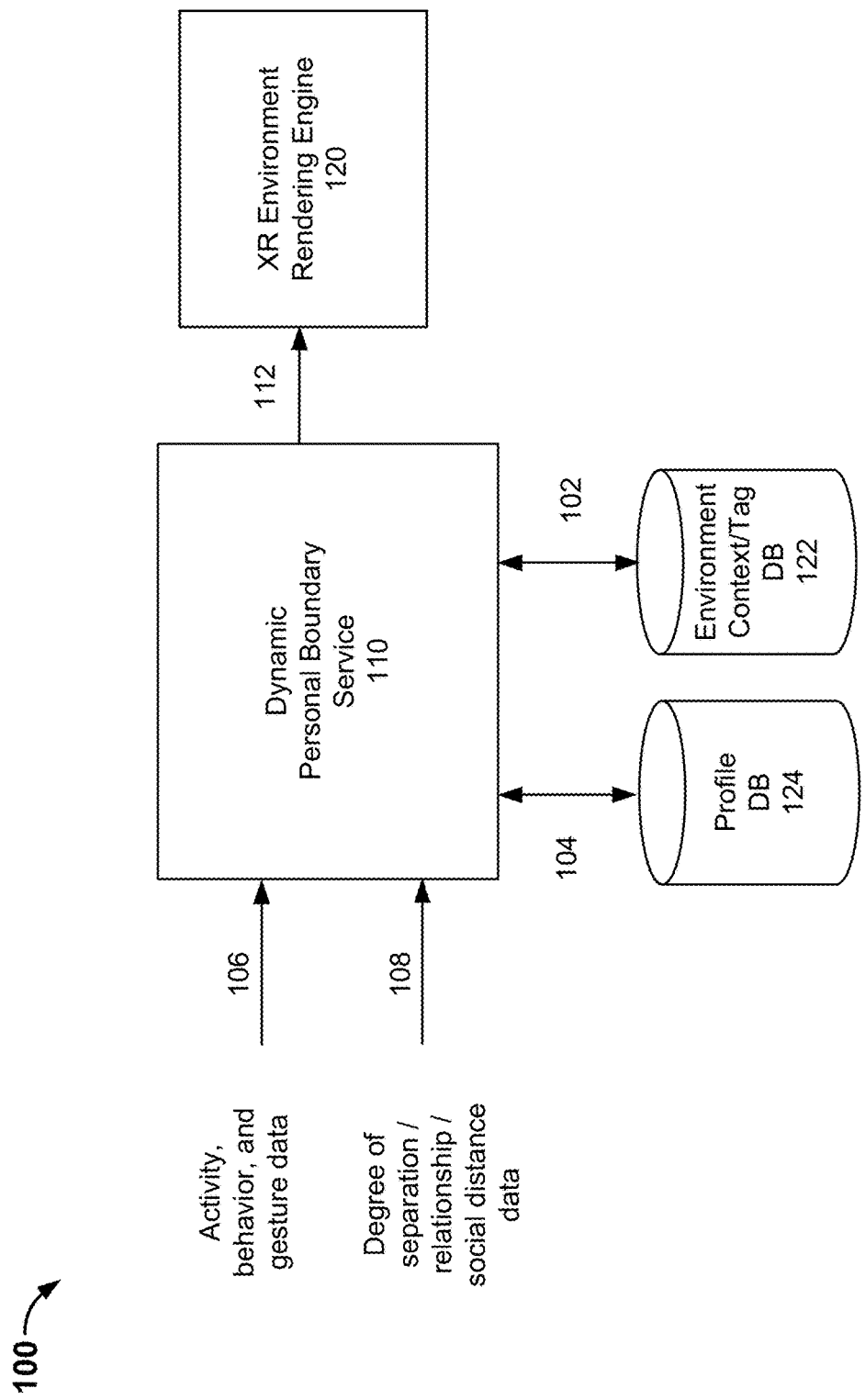
FIG. 1A shows an illustrative example of a block diagram of a system that dynamically sets and/or adjusts a personal boundary of an avatar and/or a warning zone around an avatar in an XR environment, in accordance with some embodiments of this disclosure.

FIG. 1A shows an illustrative example of a block diagram of a system 100 that dynamically sets and/or adjusts a personal boundary of an avatar and/or a warning zone around an avatar in an XR environment, in accordance with some embodiments of this disclosure. In some embodiments, the system 100 includes a dynamic personal boundary service 110, an XR environment rendering engine 120, an environment context/tag database (DB) 122, and a profile DB 124. The dynamic personal boundary service 110 may determine a personal boundary range value 112 based on various parameters such as context/tag data 102, user preference/profile information 104, activity, behavior, and gesture data 106, and degree of separation/relationship/social distance data 108.

The dynamic personal boundary service 110 may receive or access parameters such as context/tag data 102, user preference/profile information 104, activity, behavior, and gesture data 106, and degree of separation/relationship/social distance data 108. The dynamic personal boundary service 110 may receive context/tag data 102 from an environment context/tag database 122. The dynamic personal boundary service 110 may receive user preference and/or user profile information data 104 from a profile database 124. The dynamic personal boundary service 110 may access activity, behavior, and gesture data 106 (e.g., data of a first avatar and a second avatar) from a XR environment (e.g., real-time data, recent activities from an activity log database, etc.). The dynamic personal boundary service 110 may access degree of separation/relationship/social distance data 108 (e.g., between avatars) from an XR environment (e.g., social graph database, etc.).

The dynamic personal boundary service 110 may determine a personal boundary range value 112 based on the various parameters. For example, the dynamic personal boundary service 110 may calculate a personal boundary range value 112 for an avatar by determining personal boundary distances associated with each parameter and choosing the largest distance. A personal boundary range value 112 may be a maximum distance of $D_a$, $D_b$, $D_c$, and $D_d$ where $D_a$=a distance inferred from the contextual information/tag associated with different zones, $D_b$=a distance inferred from the user preferences, $D_c$=a distance inferred from the user activities/behaviors/responsive gestures/conversation, and $D_d$=a distance inferred from the degree or separation/relationships/social graph distance between the avatars. The dynamic personal boundary service 110 may output the personal boundary range value 112 to the XR environment rendering engine 120.

The XR environment rendering engine 120 may generate an XR environment for a user to experience (e.g., visual, audio, haptic, or other sensory experience etc.). The XR environment rendering engine 120 may use the personal boundary range value 112 to represent a personal boundary of an avatar in an XR environment. In some embodiments, the XR environment rendering engine 120, provides other cues or feedback (e.g., visual, haptic, audio, directional, etc.) to a user based on the personal boundary range value 112. In some embodiments, the personal boundary range value 112 may not be a single value but a range of values, and the feedback provided to the user may be based on a distance between an avatar and another avatar and the personal boundary range value 112.

In some embodiments, the system 100 uses below-mentioned parameters to dynamically set/adjust the personal boundary (or more broadly a warning zone) around avatars in an immersive environment. When the environment is rendered from the viewpoint of an avatar, the dynamically adjusted personal boundary/warning zone may allow the avatar (or user associated with the avatar) to feel safer and at the same time have enough flexibility to interact more closely with other avatars. Fpr example, the dynamic personal boundary service 110 may adjust and/or set the personal boundaries and/or warning zones based on static and/or dynamic parameters. For example, static parameters may be contextual information/tag data 102 associated with different zones in an XR environment and user preferences/profile information data 104. Dynamic parameters may be degree of separation/relationships/social graph distance data 108 between avatars and user activities/behaviors/responsive gestures/conversations data 106. The system may set/adjust personal boundaries/warning zones for each of the avatars entering a particular zone or individually set/adjust different personal boundaries/warning zone for each of the avatars. Personal boundaries between the avatars in the particular zone may be calculated based on any or combination of the four parameters previously mentioned.

Dynamic parameters may be set either by a user or the system. Each of the parameters may be used to calculate a personal boundary for an avatar. The largest personal boundary may be chosen when the avatar enters the immersive environment or a particular zone in the immersive environment. As the avatar interacts with the XR environment or other avatars in the XR environment, the system may dynamically adjust the personal boundary/warning zone for each avatar present within the particular zone. The settings for two avatars interacting with each other may be asymmetrical.

In one aspect, the system (e.g., dynamic personal boundary service 110) may allow dynamically adjusting permission of external objects or allow other avatars to interact within the virtual space around an avatar. The system may allow different rules to be defined for different virtual spaces, such as lean forward space, and peripersonal space.

In an embodiment, the system (e.g., dynamic personal boundary service 110) provides a variable personal boundary/space for different body parts. Instead of setting a fixed circular boundary for the entire body from the center of the body, the system may programmatically define a different range for different body parts.

In some embodiments, the system writes data to the environment context/tag DB 122. For example, the dynamic personal boundary service 110 may analyze activity, behavior, and gesture data 108 of avatars in a particular environment, such as a dance arena. The dynamic personal boundary service 110 may determine an average distance for avatars in the dance arena that is smaller than other places, such as a cafeteria or meeting room. The dynamic personal boundary service 110 may create a tag for the dance arena indicating an average distance as a default personal boundary of avatars in the dance arena zone. The dynamic personal boundary service 110 may store the tag in the environment context/tag DB 122.

In some embodiments, the system writes data to the profile DB 124. For example, the dynamic personal boundary service 110 may analyze activity, behavior, and gesture data 108 of a first avatar or bad actor with a second avatar or recipient and determine that the second avatar dislikes the first avatar. The profile DB 124 may store a personalized list of bad actor avatars associated with an avatar (e.g., second avatar). The dynamic personal boundary service 110 may add the first avatar as an entry to the list of entries of bad actor avatars associated with the second avatar to be stored in the profile DB 124.

Figure 1B:
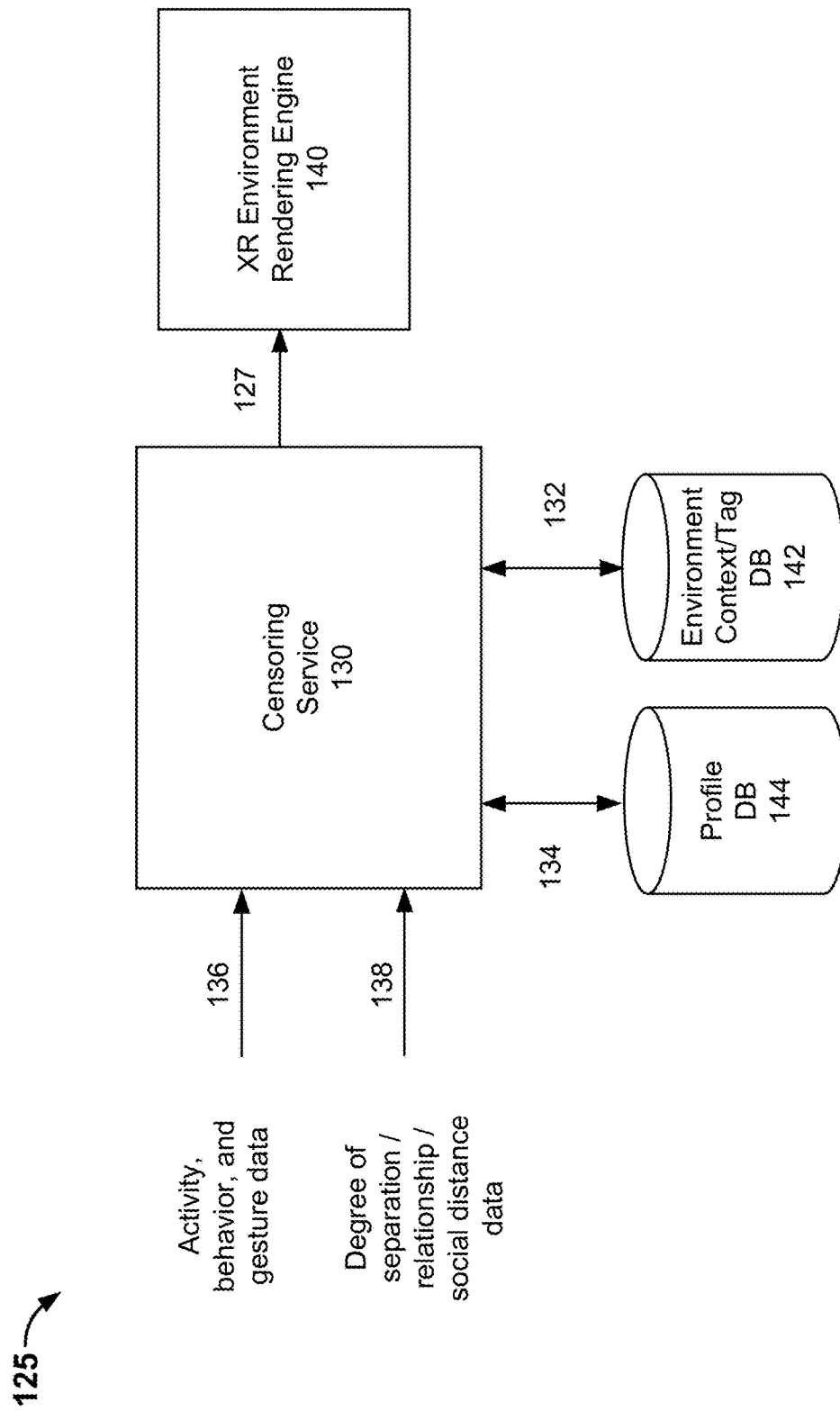
FIG. 1B shows an illustrative example of a block diagram of a system that automatically censors an avatar in an XR environment, in accordance with some embodiments of this disclosure.

FIG. 1B shows an illustrative example of a block diagram of a system 125 for automatically censoring an avatar in an XR environment, in accordance with some embodiments of this disclosure. In some embodiments, the system 125 includes a censoring service 130, an XR environment rendering engine 140, an environment context/tag database (DB) 142, and a profile DB 144. The censoring service 130 may generate instruction data 127 to censor an avatar (e.g., first avatar) based on various parameters such as context/tag data 132, user preference/profile information 134, activity, behavior, and gesture data 136, and degree of separation/relationship/social distance data 138. In some embodiments, XR environment rendering engine 140, environment context/tag DB 142, and profile DB 144 of FIG. 1B can be the same as XR environment rendering engine 120, environment context/tag DB 122, and profile DB 124 of FIG. 1A.

The censoring service 130 may receive or access parameters such as context/tag data 132, user preference/profile information 134, activity, behavior, and gesture data 136, and degree of separation/relationship/social distance data 138. The censoring service 130 may receive context/tag data 132 from an environment context/tag database 142. The censoring service 130 may receive user preference and/or user profile information data 134 from a profile database 144. The censoring service 130 may access activity, behavior, and gesture data 136 (e.g., data of a first avatar and a second avatar) from a XR environment (e.g., real-time data, recent activities from an activity log database, etc.). The censoring service 130 may access degree of separation/relationship/social distance data 138 (e.g., between avatars) from an XR environment (e.g., social graph database, etc.).

The censoring service 130 may determine instruction data 127 to censor an avatar (e.g., first avatar or bad actor) based on various parameters such as context/tag data 132, user preference/profile information 134, activity, behavior, and gesture data 136, and degree of separation/relationship/social distance data 138. In some embodiments, the context/tag data 132, user preference/profile information 134, activity, behavior, and gesture data 136, and degree of separation/relationship/social distance data 138 of FIG. 1B can be the same as context/tag data 102, user preference/profile information 104, activity, behavior, and gesture data 106, and degree of separation/relationship/social distance data 108 of FIG. 1A.

In some embodiments, the censoring service 130 includes the dynamic personal boundary service 110 of FIG. 1A and determine a personal boundary range value 112 of an avatar (e.g., second avatar or recipient), which may be used in determining how to censor an avatar. In other embodiments, the censoring service 130 may receive personal boundary range value 112 from a dynamic personal boundary service 110. The censoring service 130 may determine how to censor the first avatar (e.g., bad actor) based on a location of the first avatar in the personal boundary range value 112 of a second avatar (e.g., "recipient").

In some embodiments, the instruction data 127 includes information identifying the avatar to be censored (e.g., first avatar or bad actor) and in what manner the avatar is to be censored. For example, the instruction data 127 may provide censoring instructions for any different types of ways to censor an avatar (e.g., mute speech, replacing audio with bleeping or alternative audio, removing or blacking out text communication, indicating avatar is speaking but muting speech, indicating the avatar is not speaking and also not providing the speech, etc.).

In some embodiments, the XR environment rendering engine 140 uses the instruction data 127 to represent an avatar (e.g., first avatar or bad actor) in an XR environment as being censored. For example, the instruction data 127 may include an instruction to mute all communication from the first avatar, and the XR environment rendering engine 140 may use this instruction when rendering the XR environment to visually indicate the first avatar is not speaking (e.g., instructions may provide replacement video, rendering instructions to not move a mouth of an avatar, etc.), to not display text messages, and/or to not provide audio from the first avatar to the second avatar. In some embodiments, the instruction data 127 includes replacement audio data for muting the first avatar, and the XR environment rendering engine 140 may provide the replacement audio to a user (e.g., associated with a second avatar or recipient) to censor the speech of the first avatar. In some embodiments, the instruction data 127 includes instructions for partially censoring a first avatar such as only bad language being censored in the communication. For example, the XR environment rendering engine 140 may use the instruction data 127 to represent any different types of ways to censor an avatar (e.g., mute speech, replacing audio with bleeping or alternative audio, removing or blacking out text communication, indicating avatar is speaking but muting speech, indicating the avatar is not speaking and also not providing the speech, etc.).

In some embodiments, the censoring service 130 determines an offensiveness rating of the first avatar and compare the offensiveness rating of the first avatar and the offensiveness tolerance of the second avatar. The censoring service 130 may store the determined offensiveness rating of the first avatar as an entry associated with the first avatar or a first user ID in the profile DB 144. The censoring service 130 may retrieve the offensiveness tolerance of the second avatar as an entry associated with the second avatar or a second user ID from the profile DB 144. Additional detail regarding offensiveness rating and offensiveness tolerance may be found below in the description of FIG. 7.

The profile DB 144 may store any information associated with a user ID (or avatar) (e.g., user preference/profile information 134). For example, profile DB 144 may include entries that are rule data (e.g., rules for identifying a bad actor avatar), personalized list of bad actor avatars, personalized list of bad language, personalized list of bad behavior, an offensiveness rating, an offensiveness tolerance, a communicable distance, and any other data that may be associated with a user ID.

In some embodiments, the censoring service 130 determines how to censor an avatar (e.g., first avatar or bad actor) based on analyzing interaction data (e.g., user activities/behaviors/responsive gestures/conversations data 138). The interaction data may include data of a first avatar (or bad actor), reaction data from a second avatar (recipient), or reaction data of one or more other avatars surrounding the second avatar. Additional detail regarding analyzing interaction data may be found below in the description of FIGS. 9 and 10.

Figure 1C:
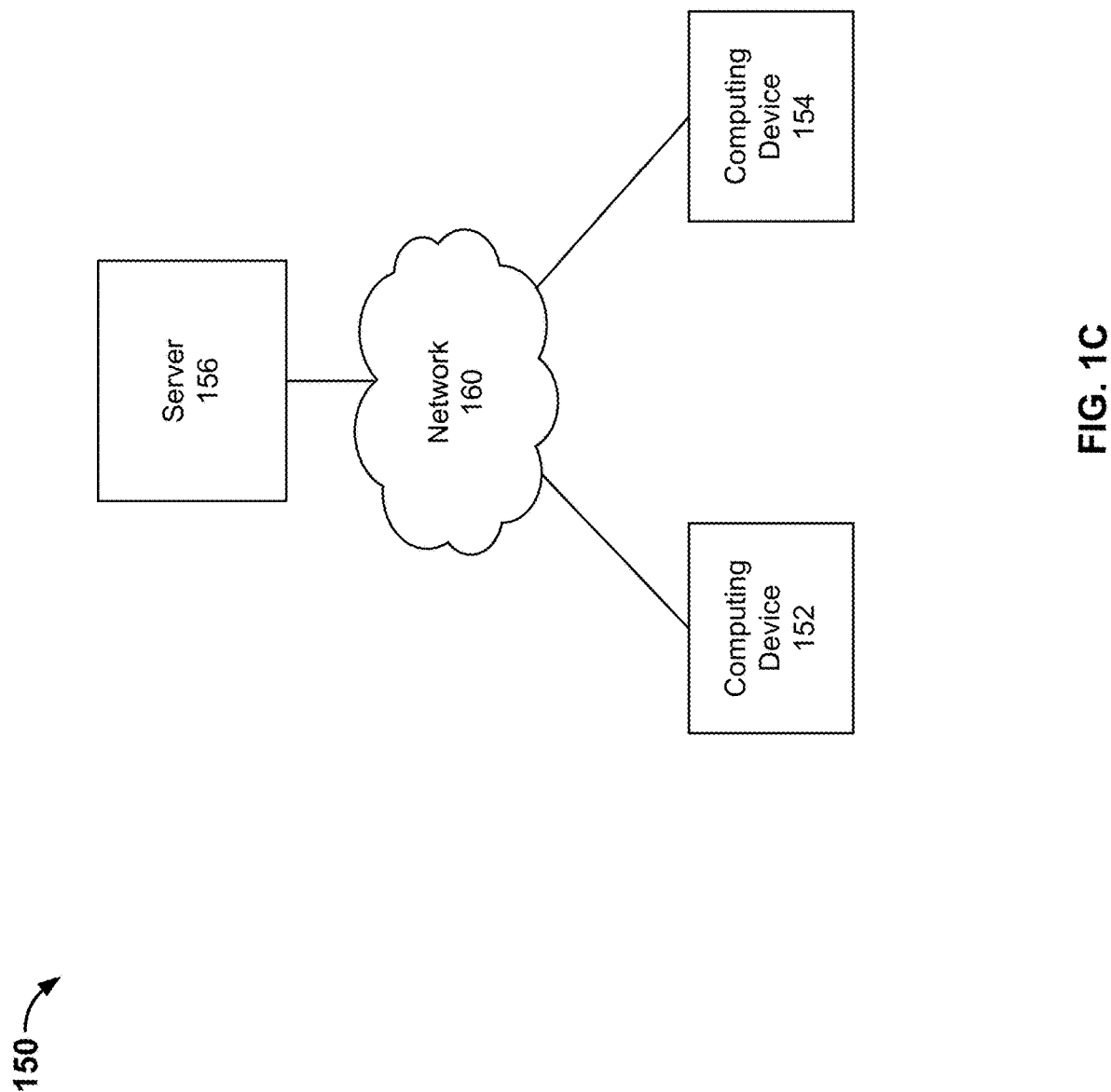
FIG. 1C shows an illustrative example of a block diagram depicting an architecture for the system, in accordance with some embodiments of this disclosure.

FIG. 1C shows an illustrative example of a block diagram depicting an architecture 150 for the system 100 or system 125, in accordance with some embodiments of this disclosure. The architecture 150 may include a computing device 152, a computing device 154, and one or more servers 156 configured to implement the techniques and methods disclosed herein. The devices of the architecture 150 may be configured to implement the components of the system 100 shown in FIG. 1A or system 125 shown in FIG. 1B.

In some embodiments, either or both computing devices 152 and 154 are devices configured to provide an XR interface. The XR interface may be a hardware or a software interface capable of displaying an interactive XR environment, such as that provided by system 100. For example, the XR interface may display an interactive XR environment with a personal boundary of an avatar in an XR environment (e.g., using a personal boundary range value 112 provided by dynamic personal boundary service 110 of system 100). The XR interface may provide other cues or feedback (e.g., visual, haptic, audio, directional, etc.) to a user. In some embodiments, the XR interface may be capable of providing visual, audio, haptic, and other types of sensory data to a user. For example, the XR interface may censor audio from a first avatar to a second avatar in an interactive XR environment (e.g., using instruction data 127 provided by of system 125). The XR interface may be capable of receiving data from the user such as visual, audio or haptic data, and capable of receiving behavioral data such as body movement and biometric sensor data from a user. For example, either or both computing devices 152 and 154 may include a camera, microphone, touch screen, motion sensors, biometric sensors, or any type of sensor for collecting user data. Data collected by either or both computing devices 152 and 154 may be activity, behavior, and gesture data 106 or 136 of system 100 or 125.

An example of a device with an XR interface may be a VR headset. Another example of an XR interface may be a browser, and example devices may be a personal computing device, mobile phone, tablet, or any other suitable device. In some instances, the computing device 154 may be associated with a "bad actor" or first avatar, and the computing device 152 may be associated with a "good actor" or second avatar.

In some embodiments, the one or more servers 156 may provide any of the components of system 100 or system 125. For example, the one or more servers 156 may provide the dynamic personal boundary service 110 or the censoring service 130, the environmental context/tag DB 122 or 132, and the profile DB 124 or 134. Either or both computing devices 152 and 154 may provide the XR environment rendering engine 120 or 140. As another example, the one or more servers 156 may provide the environmental context/tag DB 122 or 132, and the profile DB 124 or 134. Either or both computing devices 152 and 154 may provide the dynamic personal boundary service 110 or the censoring service 130 and the XR environment rendering engine 120 or 140.

The data transmitted to or received by different components of system 100 or 125 may be transmitted through network 160. Alternatively, if some of the components of system 100 or 125 are on a same server, or are on a same computing device, the data may be transmitted and received internally on the server or device. As an example, either or both computing devices 152 and 154 may transmit data from sensors representing the activity, behavior, and gesture data 106 or 136 through network 160 to be received by the one or more servers 156 that may provide the dynamic personal boundary service 110 or the censoring service 130. As another example, either or both the computing devices 152 and 154 may transmit degree of separation relationship/social distance data 108 or 138 through network 160 to be received by the one or more servers 156 that may provide the dynamic personal boundary service 110. In another embodiment, degree of separation relationship/social distance data 108 or 138 may be stored in a social graph database or another server and transmitted through network 160 to be received by a server that may provide the dynamic personal boundary service 110.

In some embodiments, cloud rendering/cloud gaming frameworks may be implemented. For example, the XR data (e.g., rendered data) for use by either or both computing devices 152 and 154 may be retrieved by either or both computing devices 152 and 154 issuing requests to the one or more servers 156 via the network 160. For example, the one or more servers 156 may provide the XR environment rendering engine 120 or 140. The one or more servers 156 may generate the XR data to either or both computing devices 152 and 154. The XR data may include visual, audio, haptic, or other sensory data for the XR environment for a user to experience. Either or both computing devices 152 and 154 may receive the XR data and provide the immersive XR environment (e.g., visual, audio, haptic, or other sensory experience) on computing device 152 and 154 (e.g., via a VR headset).

In some embodiments, some or all of the logic for dynamically setting and/or adjusting personal boundaries (e.g., dynamic personal boundary service 110) is implemented by the one or more servers 156, the computing device 152, the computing device 154, or some combination thereof. In some embodiments, some or all of the logic for the censoring (e.g., censoring service 130) is implemented by the one or more servers 156, the computing device 152, the computing device 154, or some combination thereof. In some embodiments, some or all of the logic for the analysis regarding offensiveness rating and tolerance (e.g., censoring service 130) is implemented by the one or more servers 156, the computing device 152, the computing device 154, or some combination thereof.

In an embodiment, a bad actor (e.g., first avatar) may enter the XR environment via a browser (e.g., DECENTRALAND). For example, the computing device 154 (e.g., first device) corresponding to the first avatar may have an XR interface as a browser. The recipient (e.g., second avatar) may be associated with a device with an XR interface as a VR headset (e.g., second device, computing device 152) with optical see-through functionality and/or video see-through functionality. The VR headset of the recipient may display real-world objects as well as virtual world environment and objects.

Figure 2:
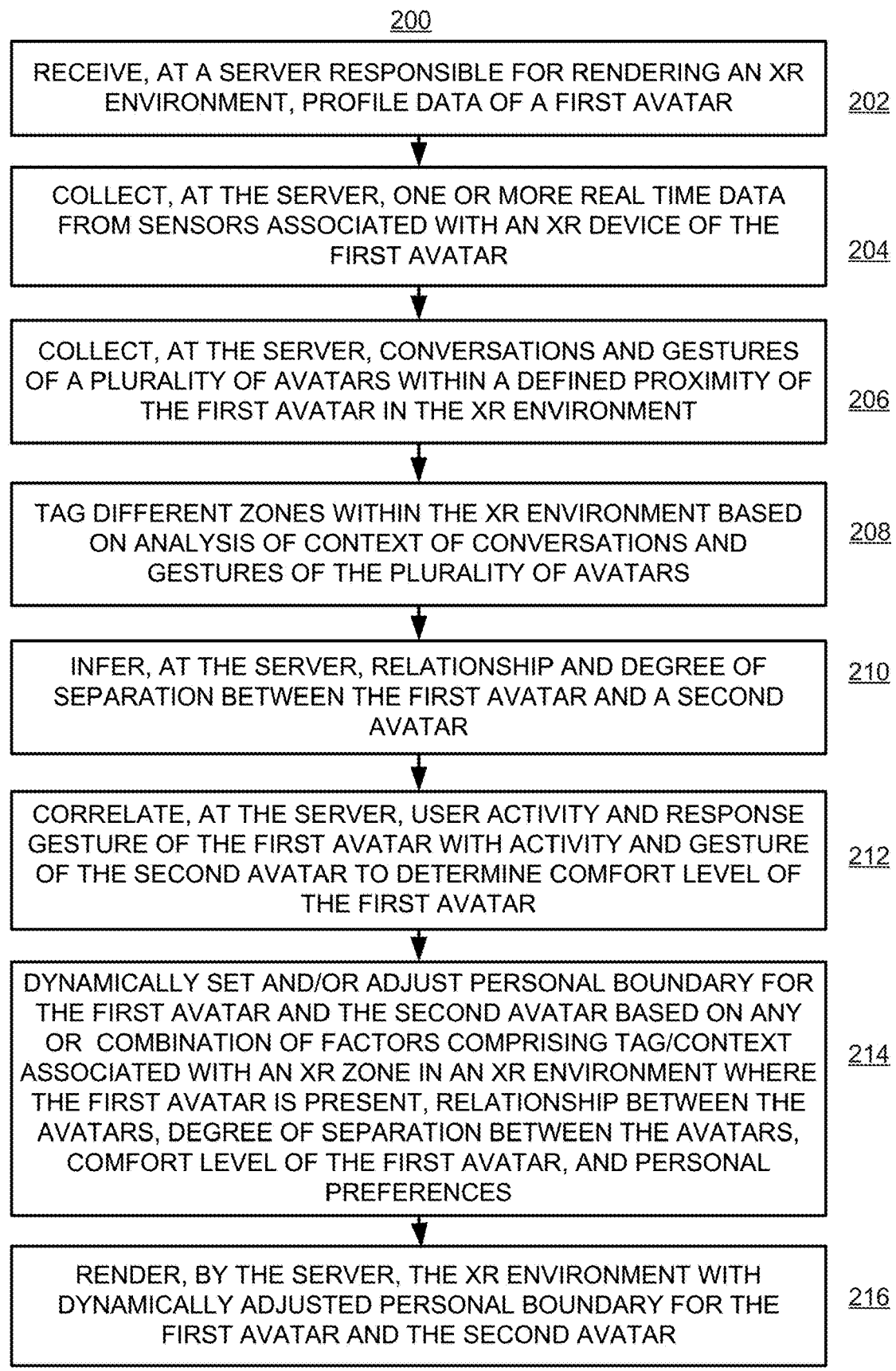
FIG. 2 shows an illustrative example of a process flow diagram of a system that dynamically sets and/or adjusts a personal boundary of an avatar and/or a warning zone around an avatar in an XR environment, in accordance with some embodiments of this disclosure.

FIG. 2 shows an illustrative example of a process flow diagram of a system that dynamically sets and/or adjusts a personal boundary of an avatar and/or a warning zone around an avatar in an XR environment, in accordance with some embodiments of this disclosure. In various embodiments, the individual steps of process 200 may be implemented by one or more components of the devices and systems of FIGS. 1A, 1B, 1C, 5-6. Although the present disclosure may describe certain steps of process 200 (and of other processes described herein) as being implemented by certain components of the devices and systems of FIGS. 1A, 1B, 1C, 5-6, this is for purposes of illustration only, and it should be understood that other components of the devices and systems of FIGS. 1A, 1B, 1C, 5-6 may implement those steps instead.

In some embodiments, the system that dynamically sets and/or adjusts a personal boundary of an avatar and/or a warning zone around an avatar in an XR environment of FIG. 2 may be the system 100 of FIG. 1A. In some instances, such as in the description of the process 200 of FIG. 2, the first avatar and second avatar may generally represent two different avatars and may not be referred to as a "bad actor" or "recipient." At step 202, the system may receive, at a server (e.g., a server including dynamic personal boundary service 110 and XR environment rendering engine 140 of FIG. 1A) responsible for rendering an XR environment, profile data of a first avatar. At step 204, the system may collect, at the server, one or more real time data (e.g., activity data) from sensors associated with an XR device of the first avatar. At step 206, the system may collect, at the server, conversations and gestures of a plurality of avatars within a defined proximity of the first avatar in the XR environment. At step 208, the system may tag different zones within the XR environment based on analysis of context of conversations and gestures of the plurality of avatars. At step 210, the system may infer, at the server, relationship and degree of separation between the first avatar and a second avatar. At step 212, the system may correlate, at the server, user activity and response gesture of the first avatar with activity and gesture of the second avatar to determine comfort level of the first avatar. At step 214, the system may dynamically set and/or adjust a personal boundary for the first avatar and the second avatar based on any or combination of factors comprising tag/context associated with an XR zone in an XR environment where the first avatar is present, relationship between the avatars, degree of separation between the avatars, comfort level of the first avatar, and personal preferences. At step 216, the system renders, by the server, the XR environment with dynamically adjusted personal boundary for the first avatar and the second avatar.

In some instances, the first avatar may be referred to as a "bad actor" and second avatar may be referred to as a "good actor," "recipient," or "victim." In an embodiment, the system may notify a second avatar or good actor when a first avatar or bad actor encroaches the warning zone around the second avatar. The system may generate a notification and alert the second avatar through audio notification or haptic feedback. For example, the server 156 may transmit a message to the device 152 (associated with a good actor) to cause the device 152 to provide the audio notification or haptic feedback, alerting a user of the device 152 that his or her warning zone has been encroached. In some instances, the notification may be provided within an XR interface provided by the device 152. The system may graduate or ramp up the notifications. For example, if the first avatar or bad actor begins to enter the space around the second avatar, the system may send the second avatar a slight haptic buzz or quiet audio cue. If the first avatar encroaches further into the space around the second avatar, the system may ramp up the cue in forcefulness/loudness to the second avatar. Additionally, as a first avatar encroaches the second avatar zone, the system may enable a hard boundary for the second avatar if not already enabled. This feature could be beneficial, particularly for when people approach an avatar from behind, and particularly for people who are sensitive to the invasion of personal space but who do not want to have a hard boundary all the time. The system may enable users to establish different settings for different layers of zones on or around their bodies. The system may provide a different range for a warning zone for different directions (e.g., control parameter for the back side warning zone may be more strict). As an example, the system may provide notifications, ramp up notifications, and/or enable a hard boundary more quickly or sooner (e.g., at a larger distance between the first and the second avatar) when the first avatar begins to enter/encroach on the space around the second avatar from behind, in comparison to when a first avatar approaches second avatar from a front side of second avatar.

In an embodiment, the system generates a notification for the first avatar or bad actor, who additionally/alternatively receives ramped feedback as the first avatar encroaches on the second avatar's zone, making the first avatar or bad actor aware that they are invading someone's personal space. The ramping up of feedback may enable people to pick up on social cues in an XR environment that would be obvious in the real world.

The system may enable auto policing in the cyber environment. Each time an avatar violates the personal boundary of other avatars even after the notification is generated, the system may analyze the type of gesture, verbal statement, degree of violation, etc., and attach a penalty score. Gesture analysis and natural language processing (NLP) for verbal statement analysis can be used to determine the penalty score. Across all the violations, penalty scores will be accumulated, and when the penalty score exceeds a threshold, the avatar may be kicked out of the environment. Different environments may have different thresholds. The avatar may be subject to certain monetary penalties and access limitations for a limited period of time. A dynamic signature/tag may also be attached to such avatars and can be displayed on top of the avatar to reflect the nature/general behavior of the avatar.

The system may alert the second avatar or good actor, about a first avatar that may have a history of violation, if the second avatar is about to face the first avatar. Navigation/directional inputs may be used to determine the probability of the second avatar meeting the first avatar. The system may also recommend an alternative route for the second avatar based on a preference of the first avatar.

In an embodiment, the system may also analyze audio inputs of avatars around the second avatar, and auto mutes an avatar (e.g., first avatar or bad actor) if the audio analysis indicates an aggressive or abusive language. The parameters listed above may also be considered to decide on whether to auto-mute an avatar. Audio input from the abusive/aggressive user may be blocked for the second avatar or good actor. Alternatively, if an avatar (e.g., second avatar) has been frequently termed as an abusive or aggressive user, the system may block any communication (e.g., text, audio data) from the bad actor (e.g., abusive or aggressive) avatar. The system may block communication from the bad actor avatar by removing or blacking out text communication, blocking audio input, muting a microphone of a user of the bad actor avatar, etc. The system may automatically block communication of the bad actor avatar when the "victim" avatar is in their vicinity.

In an embodiment, the system may also adjust the diameter or size of the personal boundary in XR environment based on a playable region boundary set for the physical space. The playable region may be a user-defined real-world region in which he or she feels free to move (without colliding with real-world objects, for example). The playable region may be a predefined shape and/or size that does not require user definition. The correlation between the personal boundary in the XR environment and the playable region boundary for the physical space may not be directly proportional. In an embodiment, the personal boundary has a shape similar or identical to the playable region boundary and has a size scaled to the playable region boundary. For example, the personal boundary may be five times the size of the playable region boundary. If desired, the playable region boundary may automatically and dynamically scale larger or smaller in size based on numerous factors, such as the number of avatars nearby, the type of room or environment the user or avatar is in, event type, user preferences, etc. The system may consider other parameters as suggested above to align the personal boundary with the playable region boundary. The system may vary the personal boundary within a min-max range to provide flexibility of interaction while still providing a safe environment.

Setting Personal Boundaries Based on Contextual Information/Tags Associated with Different Zones in the XR Environment As the user walks through the environment, contextual data or tags associated with different zones in a virtual environment may be used to set the personal boundary. The contextual data or tag may indicate the type of conversation/behavior to expect when entering such zones. Tags for different zones can be manually associated or can be determined dynamically (details on the dynamic association of context or tag are described below under heading "Adjusting personal boundaries based on user activity/behaviors/responsive gestures of the user"). Based on the associated tag/context, the system may set the personal boundary.

Figure 3:
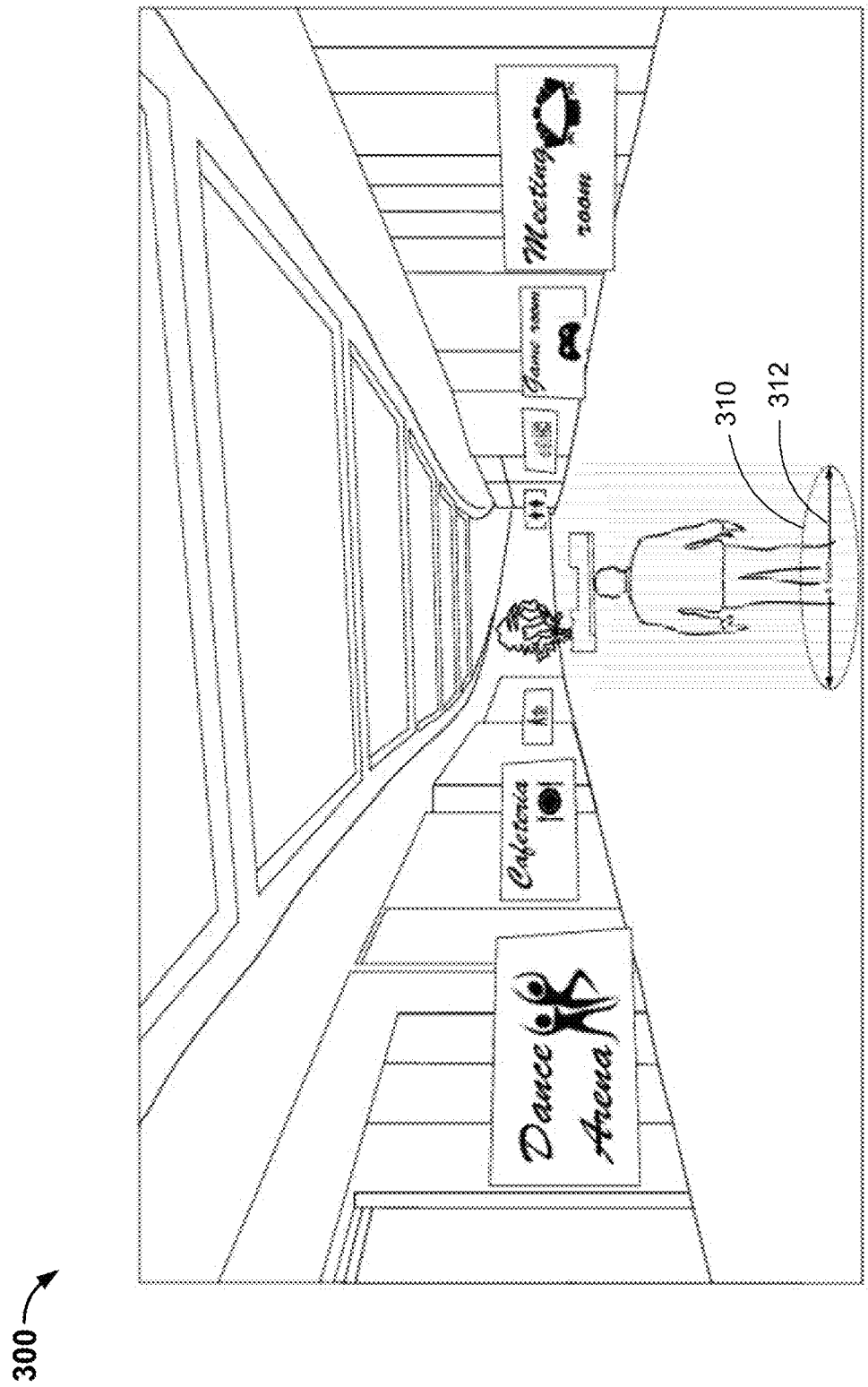
FIG. 3 shows an illustrative example of a representation of XR zones with associated tag/contextual data, in accordance with some embodiments of this disclosure.

FIG. 3 shows an illustrative example of a representation 300 of XR zones with associated tag/contextual data, in accordance with some embodiments of this disclosure. FIG. 3 depicts a user virtually visiting a public place with different zones. Each of the zones may be tagged or may have an associated context. The zones may include a dance arena, meeting room, cafeteria, game room, and so on. By default, the personal boundary 310 may be set to be with a circumference having a diameter of 4 feet. Based on the zone in which the avatar is present, the limit of the personal boundary may be either increased or decreased.

For example, when the tag indicates a formal meeting zone, the system may set a personal boundary-x, and when the tag indicates a pub/dance zone, the system may set a personal boundary-y. The system may recommend the user to set an appropriate personal boundary or automatically set the personal boundary based on the associated tag.

Figure 4A:
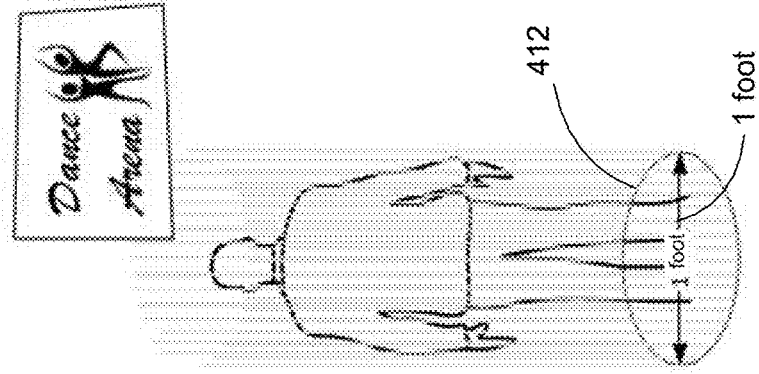
FIG. 4A shows an illustrative example of a representation of a personal boundary set based on a "Dance Arena" tag, in accordance with some embodiments of this disclosure.

FIG. 4A shows an illustrative example of a representation 410 of a personal boundary 412 set based on a "Dance Arena" tag, in accordance with some embodiments of this disclosure. In this example, the user may be visiting the dance arena with his friends or colleagues and may usually prefer to dance together by holding hands. In such a case, the personal boundary may decrease (e.g., from 4 feet diameter in FIG. 3 to 1 foot diameter in FIG. 4A).

Figure 4B:
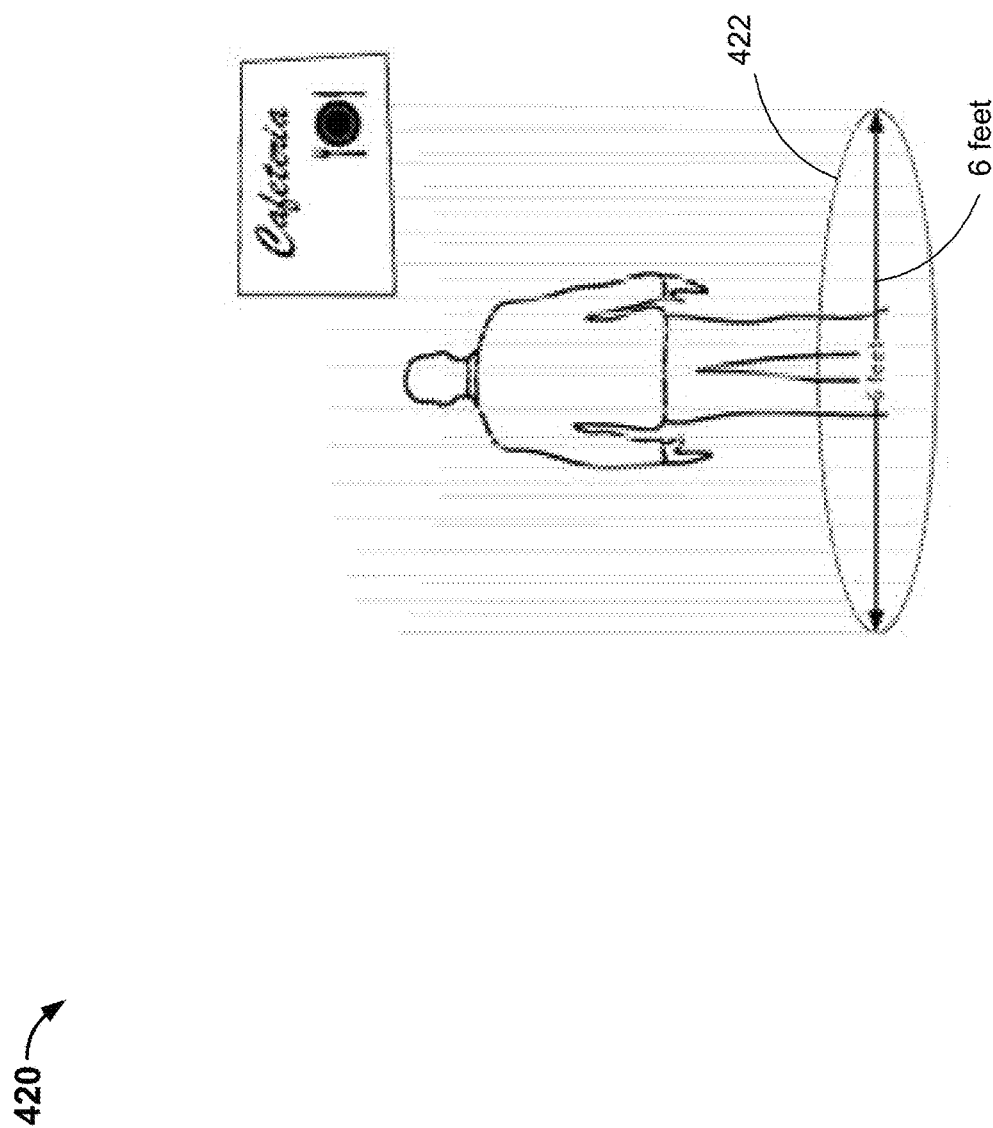
FIG. 4B shows an illustrative example of a representation of a personal boundary set based on a "Cafeteria" tag, in accordance with some embodiments of this disclosure.

FIG. 4B shows an illustrative example of a representation 420 of a personal boundary 422 set based on a "Cafeteria" tag, in accordance with some embodiments of this disclosure. For example, when a user is in a public place and inappropriate behavior was detected previously in such an environment, the user may be warned. The system may dynamically increase the personal boundary space. User(s) may be restricted to move toward other avatars (strangers) in such a place. Consider the cafeteria as one such zone. When the user is detected to be entering the cafeteria, the personal boundary may dynamically be increased (e.g., from 4 feet diameter in FIG. 3 to 6 feet diameter in FIG. 4B). The personal boundary may represent a hard boundary in which other avatars cannot enter, and the increase in personal boundary may restrict movement of the user towards other avatars in the cafeteria.

In an embodiment, the system may restrict a user from entering an inappropriate zone or at least prompt the user with a warning. This may also act as a parental control feature.

In an embodiment, if the interaction is taking place in a zone having its specifically defined characteristics (e.g., personal space, meeting room, etc.), certain interactions (close interaction, touch, whispering, etc.) along with the personal boundary limit may be set accordingly.

Figure 4C:
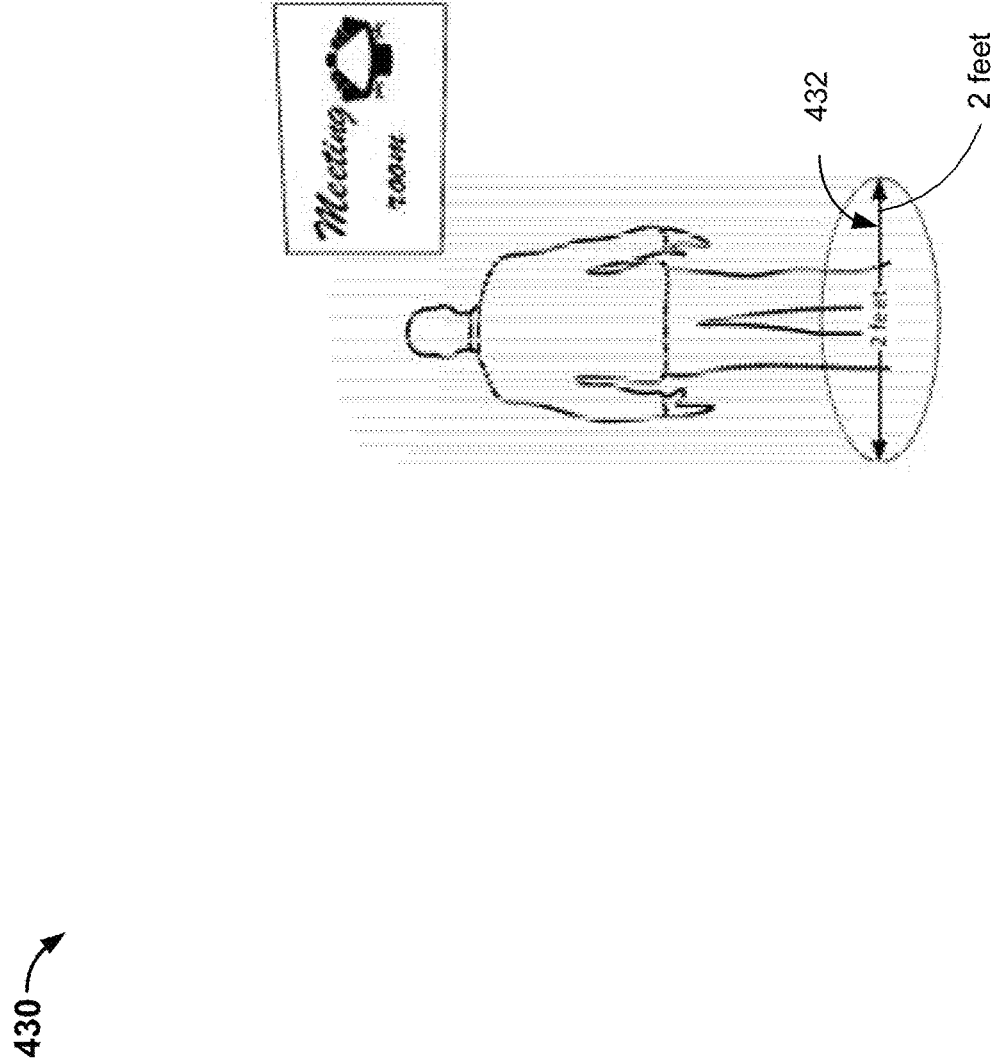
FIG. 4C shows an illustrative example of a representation of a personal boundary set based on a "Meeting Room" tag, in accordance with some embodiments of this disclosure.

FIG. 4C shows an illustrative example of a representation 430 of a personal boundary 432 set based on a "Meeting Room" tag, in accordance with some embodiments of this disclosure. In this example, the user may be in a meeting room with colleagues, and the user's personal boundary may dynamically be reduced providing flexibility to the user to interact with the colleagues (e.g., from 4 feet diameter in FIG. 3 to 2 feet diameter in FIG. 4B).

Figure 4D:
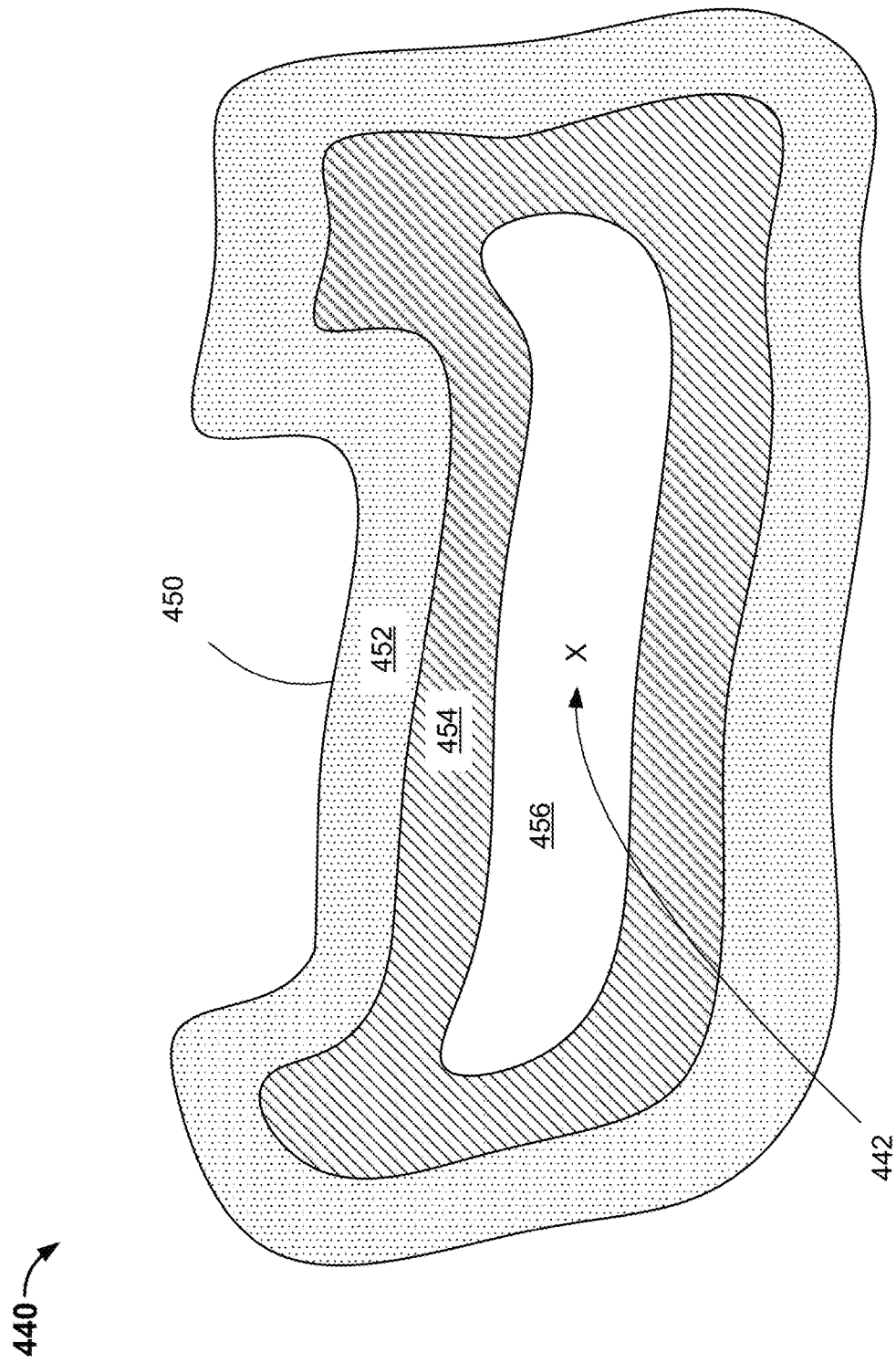
FIG. 4D shows an illustrative example of a representation of an irregularly shaped personal boundary with multiple different zones having different tolerance levels and/or rules, in accordance with some embodiments of this disclosure.

FIG. 4D shows an illustrative example of a representation 440 of an irregularly shaped personal boundary with multiple different zones having different tolerance levels and/or rules, in accordance with some embodiments of this disclosure. For example, the user/avatar may be at location 442, and the personal boundary 450 for the user/avatar may be irregularly shaped. As an example, the personal boundary 450 may be based on a shape similar or identical to the playable region boundary and may have a size scaled to the playable region boundary. The personal boundary 450 may include an outer zone 452, an intermediary zone 454, and an inner zone 456. While the example of the personal boundary 450 shows three different zones, in other embodiments any number of zones may be included in a personal boundary. While the example of personal boundary 450 is irregularly shaped, a personal boundary of other embodiments may have a regular shape (e.g., circle of a given diameter, etc.). The zones in a personal boundary may have a same spacing or different spacing between one boundary of a zone to the next. In some embodiments, the multiple different zones have different tolerance levels and/or rules. For example, each zone may be associated with different tolerance levels (e.g., offensive tolerance levels for a second avatar), and the system may provide for different types of censoring (e.g., of a first avatar) while in the different zones. For example, a first avatar being in a zone further away from the second avatar (e.g., zone 452 and/or zone 454) may provide for a more or a less degree of censoring of the first avatar (e.g., preventing all communication from reaching the second avatar without indicating the first avatar is trying to communicate, partially censored such as only bad language being censored). For example, the second avatar may have a higher offensiveness tolerance in an outer zone (e.g., zone 452) and the system may partially censor the first avatar in the outer zone. The second avatar may have a lower offensiveness tolerance in one or more inner zones (e.g., zone 456 and/or zone 454), and the system may prevent all communication from reaching the second avatar from the first avatar without indicating the first avatar is trying to communicate. In another example, the first avatar or bad actor being in an outer zone (e.g., zone 452) may indicate that the first avatar is not trying to communicate with the second avatar, and system may completely censor the first avatar in the outer zone. The first actor or bad actor avatar being in one or more inner zones (e.g., zone 454 and/or zone 456) may indicate the first avatar is trying to communicate with the second avatar, and the system may partially censor the first avatar in the one or more inner zones (e.g., such that non-offensive portions of messages are received). In some instances, while in one of the more inner layers (e.g., zone 454 and/or zone 456), the bad actor may be censored or silenced, but the recipient may be notified that the bad actor is speaking. In some embodiments, the system prompts the second avatar to take multiple actions when the first avatar is within any desired zone (e.g., inner zone such as zone 454 and/or zone 456). For example, a user of the second avatar may be prompted with an option to fully mute or silence the first avatar; an option to "disappear" the first avatar so that the user no longer sees the bad actor; an option to "kick" the first avatar to a region outside the personal boundary (e.g., personal boundary 450), etc.

Setting Personal Boundaries Based on User Personal Data/ User Preference

The system may set the personal boundary based on personal data and/or user preferences. Avatars representing users from different cultural/professional backgrounds may prefer different personal boundaries. For example, hugging a colleague may be common among people working in the film and entertainment industry but might not be so common for others. The system may use the cultural/professional background information (part of user personal data) of the avatar to automatically set the personal boundary.

The system may also allow a user to define his/her preferences for setting personal boundaries under different conditions (e.g., environment, relationship, degree of separation, etc.) In an embodiment, the user preference can be displayed to other users. Example preferences include: "accepts handshakes, does not accept hugs," a preferred distance of 4 feet, etc. Such preferences can be displayed to other avatars if desired. Specific user preferences (e.g., does not accept handshakes) can be displayed all the time or can be displayed only when the other user attempts to make an interaction (e.g., handshake) that is prohibited due to user preference, depending on the embodiment.

In some scenarios, the user may pre-define the personal boundaries for different scenarios and users. For example, the user may set to have no personal boundary within a home zone or region irrespective of who the user is surrounded with. Thus, when the user steps out of the home zone, a personal boundary may be formed. As another example, the user may have a default personal boundary and default offensiveness tolerance(s) for that boundary when entering a public space, a formal event space, etc.

Adjusting Personal Boundaries Based on User Activity/Behaviors/Responsive Gestures of the User The system may use user activities data, behavioral information, and/or responsive gesture to adjust personal boundaries. User behavioral data (e.g., body movement or biometric sensor data) can be collected from the immersive environment to determine the comfort level of the user when he/she enters a particular zone in an immersive environment or when interacting with another avatar. The system may also determine the response gestures of a second avatar when the first avatar is trying to make close contact (e.g., coming forward to hug, handshake, fist-bump, etc.) to adjust the personal boundary of the second avatar. The system may determine if the move taken by the second avatar is leading to a complimenting gesture or a defensive/non-responsive gesture. Based on the avatar's estimated response gesture, the system can dynamically adjust the personal boundary.

One or more techniques, known to a person skilled in the art, may be implemented to monitor and retrieve behavioral information or responsive gesture of the users in the virtual environment. One such technique includes implementing visual tools to trace users' behavior or activity in the virtual environment. Real-time data communication is employed to track the accurate location and orientation of the head-mounted display device worn by the user. The collected data is used to predict the movements of the user by using nonlinear autoregressive (NAR) and location in the application by the nonlinear autoregressive neural network with exogenous inputs (NARX).

The system may analyze historic or ongoing conversations between different avatars in a virtual world, determine the context and intensity of conversation, and may adjust the personal boundary accordingly. In an embodiment, the system may analyze historical or ongoing conversations between all the avatars present within a zone and associate a context/tag with such a zone. Context data/tags associated with different zones can be dynamically updated. The system may associate a broader category of conversation and/or behavior (e.g., friendly, casual, formal, abusive, etc.) with the specific zone. A poster/tag can be designed to represent such zones.

Using historic conversation between two users, if they have always had a friendly or formal conversation, the personal boundary may be reduced to keep minimal for more interactive conversations. However, if previously the two users had abusive conversations, the personal boundary may be increased.

In an embodiment, when a particular user is detected to have provided inappropriate comments and in real-time when there is a possibility that the other user may act inappropriately, the personal boundaries of other avatars approaching the user are increased. Initially, the personal boundaries between avatars may be fixed and can be increased or decreased based on the going conversation between the avatars. Considering the context of the ongoing conversation is to build friendship between the users, the personal boundaries may be decreased. Likewise, if the ongoing conversation is leading to a fight, the personal boundaries may be increased.

The system may analyze social media interaction, chat history, and other communications between two users to automatically set the personal boundary. The behavior of the user in one-to-one conversations and group conversations can be analyzed to set different personal boundaries.

When the interaction history with an avatar is determined to be negative, the system may automatically remove such avatars from the environment. If a first avatar or bad actor has a negative interaction only with the second avatar, the system may either automatically disable the presence of the first avatar or bad actor from the environment rendered for the second avatar. It may happen that the first avatar or bad actor can be seen by another avatar or user but will be disabled for the second avatar or user. The system may also provide an option to the second avatar to enable/disable the presence of the first avatar.

In an embodiment, the system uses situational awareness (context analysis) of the active interactions to dynamically adjust the personal boundary. For example, in a gaming environment, an avatar may have gone through an accident and may require to be lifted by a strange person, the system may use situational awareness of the accident to adjust the personal boundary to enable lifting. The personal boundary of helping a user in the virtual, approaching to help, may be adjusted to aid in helping.

In an embodiment, the system uses the facial expression or body language of other avatars around the first avatar to dynamically adjust the personal boundary of the first avatar. It has been observed in real life that people tend to avoid interacting with people reflecting angry expressions or whose body language is bold. The system may use programmed facial expressions or the facial expression of an associated user of a second avatar to adjust the personal boundary of a first avatar.

Adjusting Personal Boundaries Based on the Degree of Separation/Relationships/Social Graph Distance Between Avatars The system may use relationship information and social graph distance (degree of separation) between the first avatar and the second avatar to adjust the personal boundary of the first avatar. If the avatars are in friendly relation, the system may automatically reduce or eliminate the personal boundary and enable handshake, high-five, fist-bump, friendly touch, etc. If the avatars or users are family, the system may enable closer interactions by reducing or eliminating one or more personal boundaries. As the relationship between the users develops or deteriorates, the system may automatically adjust one or more personal boundaries of the relevant avatars or users accordingly. The system may determine the warmness of the relationship based on an analysis of recent conversations and interaction data. The system may infer a relationship based on an analysis of behaviors, communication, or interactions. In an embodiment, the system determines a relationship from relationship information that is explicitly or formally disclosed or entered by one or more users.

The system may use a social graph to determine a degree of separation between the avatars and may adjust the personal boundary accordingly. Two users separated by one degree of connection may be understood to know each other and may have a formal or informal direct connection to each other. Two users separated by two degrees of separation may be understood to not know each other, or at the very least to have no formal direct connection to each other. Rather, they are each directly linked to at least one other person. For example, Alice and Bob might not know each other. But they may both know Charles, thus establishing two degrees of separation between Alice and Bob. The degree of separation may be determined based on explicit relationships (e.g., "friends" or connections explicitly established by the users, as one finds on typical social media platforms). The system may leverage explicit relationships from other platforms if desired. In an embodiment, the degree of separation between two users or avatars may be determined from an analysis of historical interactions. The more degrees of separation between two avatars or users, the more likely it is that the two are strangers with little social overlap. By contrast, two users or avatars having only one or two degrees of separation likely have more social overlap, suggesting more familiarity between the two. As previously suggested, the system may use a social graph of any existing social media platform or may develop a social graph of avatars in the immersive environment. GRAPHS API (e.g., METAGRAPH API) calls can be initiated to pull out the details on the degree of separation between the avatars. OCULUS SDK allows access to information about a user, the user's relationship with friends, and the user's recent encounters in VR. The system may use the degree of separation and recent encounter data to automatically adjust the personal boundary. If desired, a user may manually adjust or override an automatically configured personal boundary.

In an embodiment, a comprehensive social graph can be created by compiling data received from different social media platforms.

ADDITIONAL EMBODIMENTS

Adjusting Virtual Space Associated with a Zone

In an embodiment, the system may use adjusted personal boundaries information of each of the avatars present in a particular zone to increase/decrease virtual space reserved for the particular zone. The auto-scaling of the zone may facilitate platform providers to charge dynamic rental for the space.

The user may be prompted with a message that allows them to accept/reject a change in their personal boundary when the system determines that the boundary may be adjusted.

Creating Different Perceptions

The system may also help to create a different perception of virtual boundaries for different avatars. For example, a first avatar may perceive 4 feet personal boundary limit, whereas a second avatar may perceive 2 feet personal boundary.

The system may be used by metaverse platforms (e.g., FACEBOOK HORIZON, HTC VIVERSE, MICROSOFT ALTSPACEVR, VRCHAT, etc.).

Figure 5:
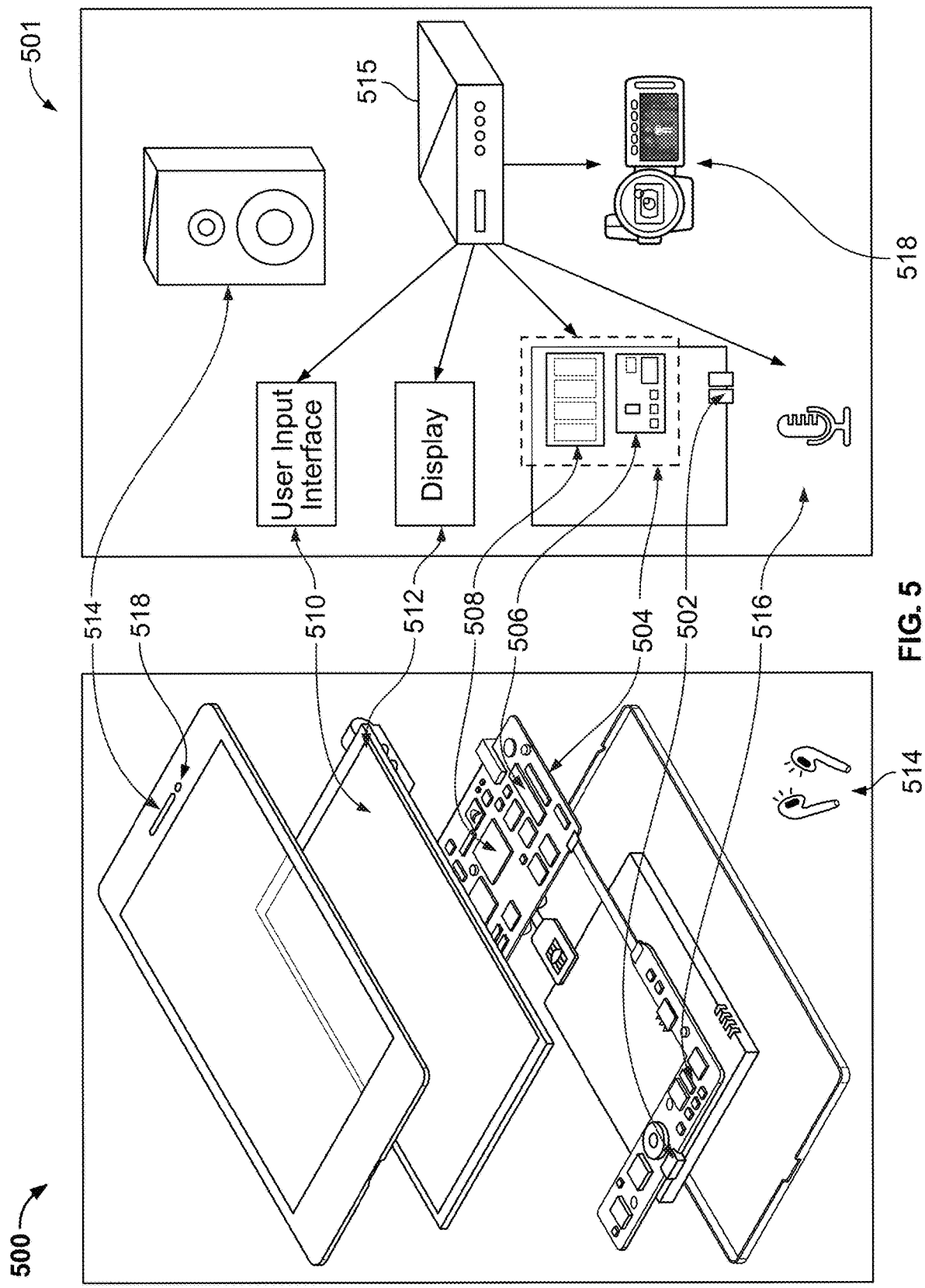
FIG. 5 shows an illustrative user equipment device, in accordance with some embodiments of this disclosure.
Figure 6:
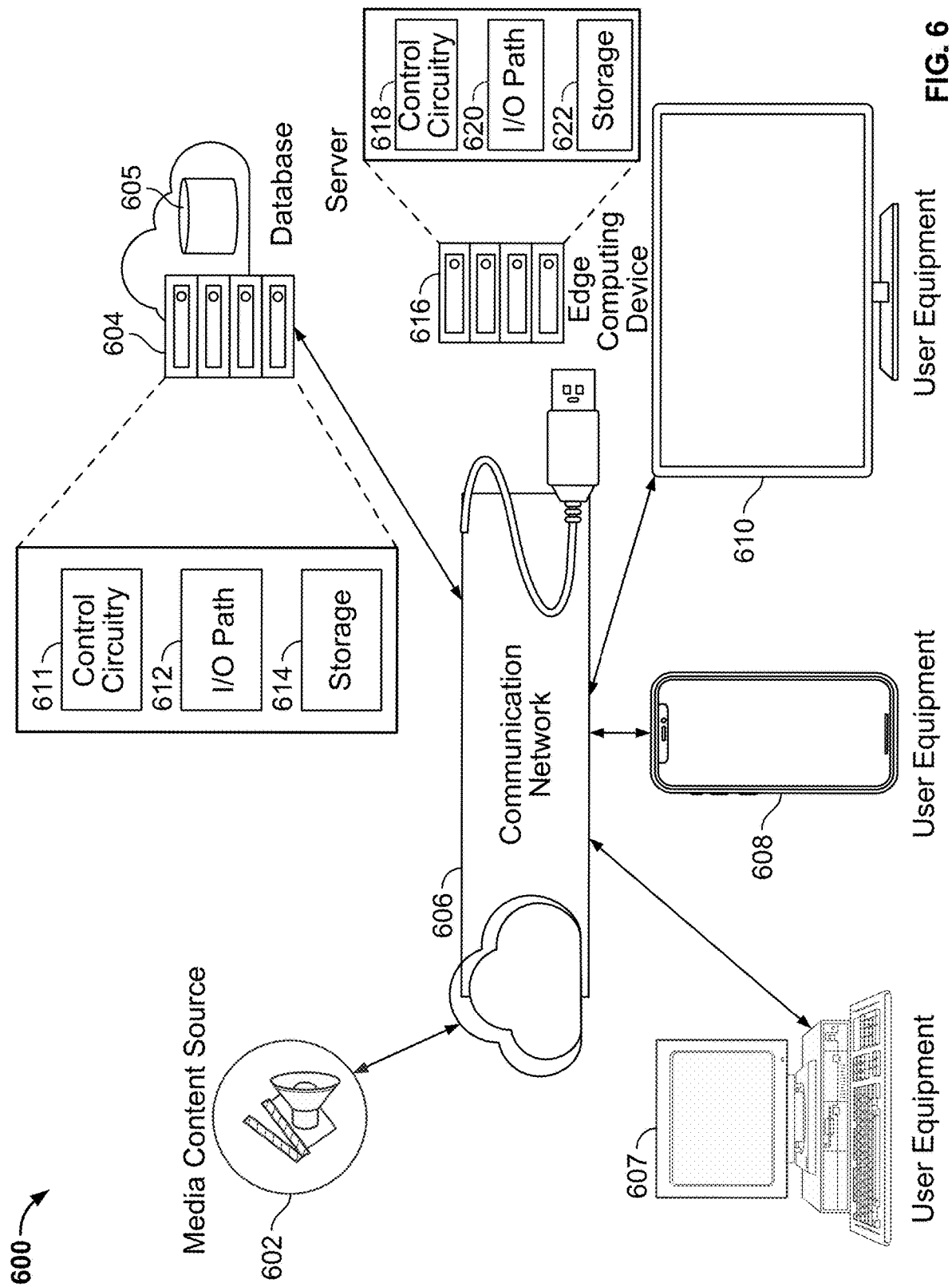
FIG. 6 shows an example system, in accordance with some embodiments of this disclosure

FIGS. 5-6 depict illustrative devices, systems, servers, and related hardware for dynamically setting and/or adjusting personal boundaries for avatars and/or warning zones around avatars, and automatically censoring avatars in an XR environment. FIGS. 5 and 6 show generalized embodiments of illustrative user equipment devices 500 501, 607, 608, and 610, any one of which may represent an example of either of the devices 152 or 154 shown in FIG. 1C. The server 604 shown in FIG. 6 may represent an example of the server 156 shown in FIG. 1C in an embodiment.

For example, user equipment device 500 may be a smartphone device, a tablet, an extended reality (XR) (e.g., virtual reality or augmented reality) device, or any other suitable device capable of processing video data. In another example, user equipment device 501 may be a user television equipment system or device. User television equipment device 501 may include set-top box 515. Set-top box 515 may be communicatively connected to microphone 516, audio output equipment (e.g., speaker or headphones 514), and display 512. In some embodiments, display 512 may be a television display or a computer display. In some embodiments, set-top box 515 may be communicatively connected to user input interface 510. In some embodiments, user input interface 510 may be a remote-control device. Set-top box 515 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 500 and user equipment device 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While set-top box 515 is shown in FIG. 6 for illustration, any suitable computing device having processing circuitry, control circuitry, and storage may be used in accordance with the present disclosure. For example, set-top box 515 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the XR application stored in memory (e.g., storage 508). Specifically, control circuitry 504 may be instructed by the XR application to perform the functions discussed above and below. For example, the XR application may include logic or instructions to render an XR environment (e.g., associated with XR environment rendering engine 120 and 140 of FIGS. 1A and 1). For example, the XR application may include logic or instructions for dynamically setting and/or adjusting personal boundaries for avatars and/or warning zones around avatars (e.g., associated with dynamic personal boundary service 110 of FIG. 1A). For example, the XR application may include logic or instructions for the censoring (e.g., associated with censoring service 130 of FIG. 1). For example, the XR application may include logic or instructions for the analysis regarding the offensiveness rating and tolerance (e.g., associated with censoring service 130 of FIG. 1). In some implementations, processing or actions performed by control circuitry 504 may be based on instructions received from the XR application.

In client/server-based embodiments, control circuitry 504 may include communications circuitry suitable for communicating with a server or other networks or servers. The XR application may be a stand-alone application implemented on a device or a server. The XR application may be implemented as software or a set of executable instructions. The instructions for performing any of the embodiments discussed herein of the XR application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a device 500.

In some embodiments, the XR application may be a client/server application where only the client application resides on device 500, and a server application resides on an external server (e.g., server 604 and/or server 616). For example, the XR application may be implemented partially as a client application on control circuitry 504 of device 500 and partially on server 604 as a server application running on control circuitry 611. Server 604 may be a part of a local area network with one or more of devices 500 or may be part of a cloud computing environment accessed via the internet. In a cloud computing environment, various types of computing services for performing searches on the internet or informational databases, providing dynamically setting and/or adjusting personal boundaries for avatars and/or warning zones around avatars, and automatically censoring avatars in an XR environment capabilities, providing storage (e.g., for a database) or parsing data (e.g., using machine learning algorithms) are provided by a collection of network-accessible computing and storage resources (e.g., server 604 and/or edge computing device 616), referred to as "the cloud." Device 500 may be a cloud client that relies on the cloud computing capabilities from server 604 to determine whether virtual processing (e.g., at least a portion of virtual background processing and/or at least a portion of other processing tasks) should be offloaded from the mobile device, and facilitate such offloading. When executed by control circuitry of server 604 or 616, the XR application may instruct control circuitry 611 or 618 to perform processing tasks for the client device and facilitate the dynamically setting and/or adjusting personal boundaries for avatars and/or warning zones around avatars, and automatically censoring avatars in an XR environment.

Control circuitry 504 may include communications circuitry suitable for communicating with a server, edge computing systems and devices, a table or database server, or other networks or servers. The instructions for carrying out the above mentioned functionality may be stored on a server (which is described in more detail in connection with FIG. 6). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as XR application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of user equipment 500. Control circuitry 504 may also include digital-to-analog converter circuitry and analog-to-digital converter circuitry for converting between digital and analog signals. The tuning and encoding circuitry may be used by user equipment device 500, 501 to receive and to display, to play, or to record content. The tuning and encoding circuitry may also be used to receive video data for dynamically setting and/or adjusting personal boundaries for avatars and/or warning zones around avatars, and automatically censoring avatars in an XR environment. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of each one of user equipment device 500 and user equipment device 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to set-top box 515.

Audio output equipment 514 may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Audio output equipment 514 may be provided as integrated with other elements of each one of device 500 and equipment 501 or may be stand-alone units. An audio component of videos and other content displayed on display 512 may be played through speakers (or headphones) of audio output equipment 514. In some embodiments, audio may be distributed to a receiver (not shown), which processes and outputs the audio via speakers of audio output equipment 514. In some embodiments, for example, control circuitry 504 is configured to provide audio cues to a user, or other audio feedback to a user, using speakers of audio output equipment 514. There may be a separate microphone 516 or audio output equipment 514 may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504. Camera 518 may be any suitable video camera integrated with the equipment or externally connected. Camera 518 may be a digital camera comprising a charge-coupled device (CCD) and/or a complementary metal-oxide semiconductor (CMOS) image sensor. Camera 518 may be an analog camera that converts to digital images via a video card.

The XR application may be implemented using any suitable architecture. For example, it may be a stand-alone application wholly-implemented on each one of user equipment device 500 and user equipment device 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide dynamically setting and/or adjusting personal boundaries for avatars and/or warning zones around avatars, and automatically censoring avatars in an XR environment functionality and perform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the XR application is a client/server-based application. Data for use by a thick or thin client implemented on each one of user equipment device 500 and user equipment device 501 may be retrieved on-demand by issuing requests to a server remote to each one of user equipment device 500 and user equipment device 501. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the XR application may be downloaded and interpreted or otherwise run by an interpreter or virtual machine (run by control circuitry 504). In some embodiments, the XR application may be encoded in the ETV Binary Interchange Format (EBIF), received by control circuitry 504 as part of a suitable feed, and interpreted by a user agent running on control circuitry 504. For example, the XR application may be an EBIF application. In some embodiments, the XR application may be defined by a series of JAVA-based files that are received and run by a local virtual machine or other suitable middleware executed by control circuitry 504. In some of such embodiments (e.g., those employing MPEG-2 or other digital media encoding schemes), XR application may be, for example, encoded and transmitted in an MPEG-2 object carousel with the MPEG audio and video packets of a program.

FIG. 6 is a diagram of an illustrative system 600 for dynamically setting and/or adjusting personal boundaries for avatars and/or warning zones around avatars, and automatically censoring avatars in an XR environment, in accordance with some embodiments of this disclosure. User equipment devices 607, 608, 610 (e.g., which may correspond to one or more of computing device 212 may be coupled to communication network 606). Communication network 606 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 606.

System 600 may comprise media content source 602, one or more servers 604, and one or more edge computing devices 616 (e.g., included as part of an edge computing system). In some embodiments, the XR application may be executed at one or more of control circuitry 611 of server 604 (and/or control circuitry of user equipment devices 607, 608, 610 and/or control circuitry 618 of edge computing device 616). In some embodiments, data may be stored at database 605 maintained at or otherwise associated with server 604, and/or at storage 622 and/or at storage of one or more of user equipment devices 607, 608, 610.

In some embodiments, server 604 may include control circuitry 611 and storage 614 (e.g., RAM, ROM, Hard Disk, Removable Disk, etc.). Storage 614 may store one or more databases. Server 604 may also include an input/output path 612. I/O path 612 may provide data for dynamically setting and/or adjusting personal boundaries for avatars and/or warning zones around avatars, and automatically censoring avatars in an XR environment, device information, or other data, over a local area network (LAN) or wide area network (WAN), and/or other content and data to control circuitry 611, which may include processing circuitry, and storage 614. Control circuitry 611 may be used to send and receive commands, requests, and other suitable data using I/O path 612, which may comprise I/O circuitry. I/O path 612 may connect control circuitry 611 (and specifically control circuitry) to one or more communications paths.

Control circuitry 611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 611 executes instructions for an emulation system application stored in memory (e.g., the storage 614). Memory may be an electronic storage device provided as storage 614 that is part of control circuitry 611.

Edge computing device 616 may comprise control circuitry 618, I/O path 620, and storage 622, which may be implemented in a similar manner as control circuitry 611, I/O path 612, and storage 624, respectively of server 604. Edge computing device 616 may be configured to be in communication with one or more of user equipment devices 607, 608, 610 and video server 604 over communication network 606, and may be configured to perform processing tasks (e.g., for dynamically setting and/or adjusting personal boundaries for avatars and/or warning zones around avatars, and automatically censoring avatars in an XR environment) in connection with ongoing processing of video data. In some embodiments, a plurality of edge computing devices 616 may be strategically located at various geographic locations, and may be mobile edge computing devices configured to provide processing support for mobile devices at various geographical regions.

Figure 7:
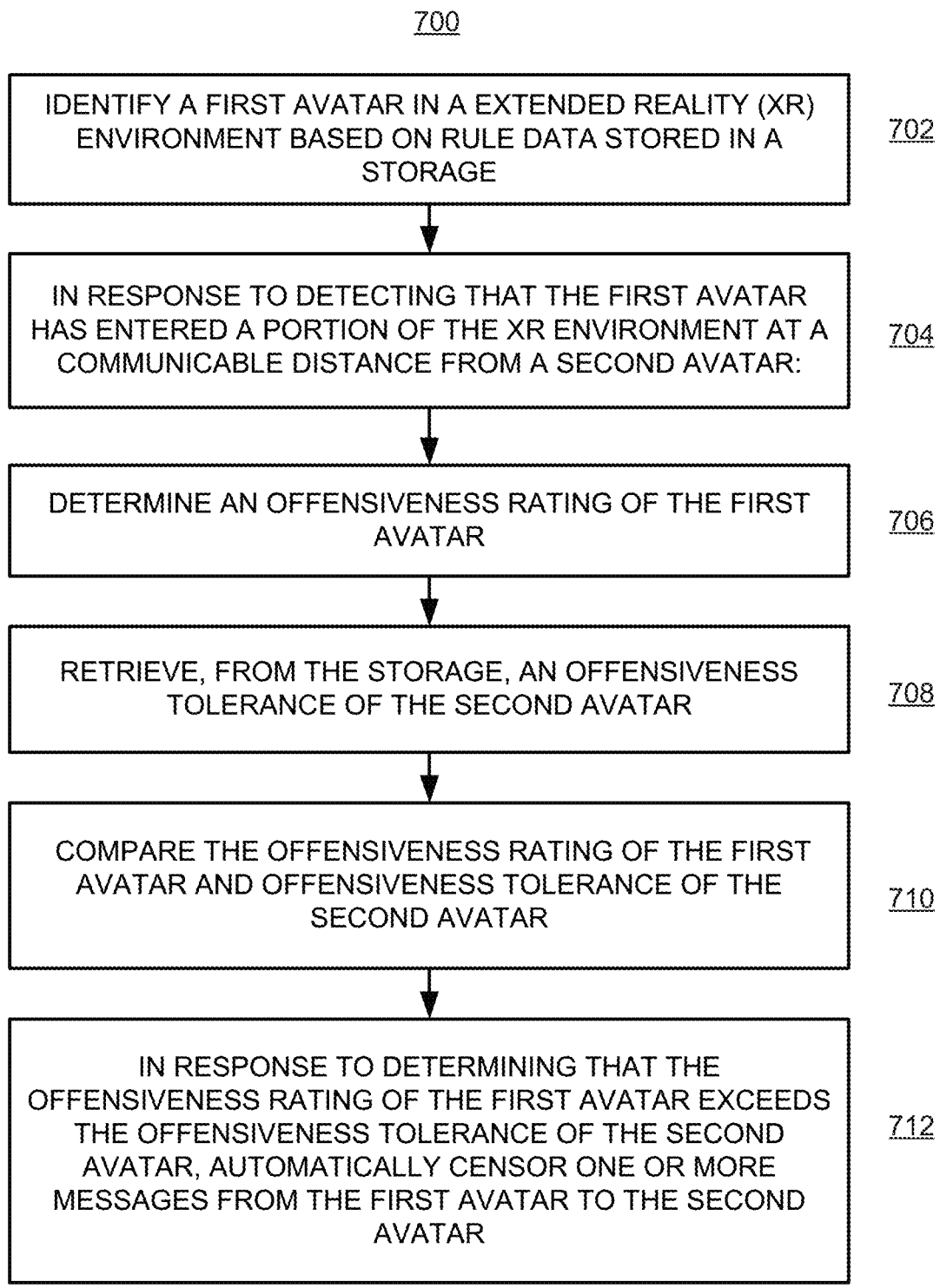
FIG. 7 is a flowchart of a detailed illustrative process for automatically censoring a first avatar in an XR environment, in accordance with some embodiments of this disclosure.

FIG. 7 is a flowchart 700 of a detailed illustrative process for automatically censoring a first avatar in an XR environment, in accordance with some embodiments of this disclosure. In various embodiments, the individual steps of process 700 may be implemented by one or more components of the devices and systems of FIGS. 1A, 1B, 1C, 5-6. Although the present disclosure may describe certain steps of process 700 (and of other processes described herein) as being implemented by certain components of the devices and systems of FIGS. 1A, 1B, 1C, 5-6, this is for purposes of illustration only, and it should be understood that other components of the devices and systems of FIGS. 1A, 1B, 1C, 5-6 may implement those steps instead.

At step 702, control circuitry (e.g., control circuitry 611, control circuitry 618, or control circuitry of any of devices 607, 608, or 610) identifies a first avatar in an extended reality (XR) environment based on rule data stored in a storage. Rule data may comprise rules that identify an avatar as having bad behavior in an XR environment. For example, a rule that identifies bad behavior may be use of language that include swear words, derogatory terms, abusive language, aggressive language, etc. A rule may be use of aggressive or abusive gestures (e.g., pointing, hitting, punching, flipping someone off, kicking). A rule may be that an avatar is on a personal bad actor list of another avatar (e.g., personalized blocklist).

At step 704, control circuitry, in response to detecting that the first avatar has entered a portion of the XR environment at a communicable distance from a second avatar, performs the following steps 706, 708, 710, and 712. The communicable distance may be a distance at which an avatar can detect or receive messages from another avatar. The communicable distance may be based on user input preference data stored in storage in association with the second avatar. For example, a user of the second avatar may set the communicable distance for the second avatar. The communicable distance may be based on contextual data stored in the storage in association with a zone (e.g., region in an XR environment). For example, the communicable distance may be set by what type of room the user is in. The communicable distance for a meeting room may be larger than a communicable distance in a cafeteria. For example, a meeting room generally includes people that are meeting for a specific purpose to communicate and may be easier for persons to communicate over larger distances. A cafeteria may indicate a smaller communicable distance because there may be multiple conversations going on in the cafeteria.

At step 706, control circuitry determines an offensiveness rating of the first avatar. The offensiveness rating may be a rating associated with an avatar based on either (i) cumulative behavior or (ii) a single action/gesture/speech. For example, the offensiveness rating may be determined based on cumulative behavior such as a number of rules an avatar has violated. The offensiveness rating may be based on a weighted average of the rules the avatar has violated. The weighted average may vary with severity of the violation, or may vary with more recent violations being weighted more heavily than older violations. In another example, the offensiveness rating may be determined based on a single action/gesture/speech such as a single instance of swearing. The offensiveness rating may be represented by a letter grade of A-F (e.g., "A" indicating very offensive and "F" indicating not offensive). The offensiveness rating may be represented by a score on a scale of 1-100 (e.g., 1 being the least offensive and 100 being the most offensive). In some embodiments, the offensiveness rating of the first avatar is tied to a user ID (and thus a particular user) of the first avatar. For example, a user associated with the user ID may utilize other avatars in some instances, and each may have the same offensiveness rating. In such embodiments, the offensiveness rating may account for the aggregate behaviors of the various avatars tied to the user ID. In some embodiments, the offensiveness rating is tied to the first avatar and not other avatars owned or used by the user associated with the first avatar. For example, a user ID for the user of the first avatar may be linked to numerous avatars or characters, each of which may have its own offensiveness rating.

At step 708, control circuitry retrieves, from the storage, an offensiveness tolerance of the second avatar. An offensiveness tolerance may be a level of offensiveness that an avatar can tolerate. For example, an offensiveness tolerance may be represented by a score on a scale of 1-100 (e.g., 1 indicating a lowest tolerance for offensiveness, and 100 indicating the highest tolerance for offensiveness). An offensiveness tolerance may be represented by a letter grade of A-F (e.g., "A" indicating highest tolerance for offensive behavior, and "F" indicating lowest tolerance for offensive behavior). In some embodiments, the offensiveness tolerance may be based on user input preference data stored in storage in association with an avatar. For example, the user input preference data may be generic, and a user of an avatar may input a tolerance for offensive language/behavior on a sliding scale of 1-100 as the user input preference data. In some embodiments, the user input preference data may be or include a personal blocklist including specific behaviors and/or words. For example, the user of an avatar may input a list of specific behaviors and/or words on the personal blocklist that he or she wishes to avoid. In some embodiments, the offensiveness tolerance of the second avatar is tied to a user ID (and thus a particular user) of the second avatar. In some embodiments, the offensiveness tolerance is tied to the second avatar and not other avatars owned or used by the user associated with the second avatar. For example, a user ID for the user of the second avatar may be linked to numerous avatars or characters, each of which may have its own offensiveness tolerance. In some embodiments, the offensiveness tolerance for the second avatar may be a region-wide or a community-wide tolerance that applies for any avatar that happens to be in the region or community (e.g., the second avatar). In some instances, the offensiveness tolerance for the second avatar may be partially or completely tailored to the second avatar/user. In some instances, the offensiveness tolerance may be binary in nature, and may be automatically or manually set to "off" in some circumstances (e.g., for users having a high tolerance for offensive behavior). As an example, setting the offensiveness tolerance to "off" may indicate a highest tolerance for offensiveness (e.g., score of "100" or letter grade of "A").

At step 710, control circuitry, compares the offensiveness rating of the first avatar and offensiveness tolerance of the second avatar. For example, the first avatar may have an offensiveness rating of "A" and the offensiveness tolerance of the second avatar is "B". In response to determining, based on the comparing, that the offensiveness rating of the first avatar exceeds the offensiveness tolerance of the second avatar, the control circuitry may automatically censor messages from the first avatar to the second avatar. Continuing with this example, the first avatar having an offensiveness rating of "A" exceeds the offensiveness tolerance of "B" of the second avatar. The control circuitry may automatically censor one or more messages from the first avatar to the second avatar. In an embodiment, when other avatars are proximate to the first or second avatars, messages from the first avatar are also censored from the perspective of the other avatars. For example, the second avatar and the other avatars may be in a group (e.g., with a dedicated communication channel for the group), and the messages may be censored for the entire group. In an embodiment, a different analysis is conducted for each member of the group. If desired, messages may be censored for the entire group based on the most sensitive offensiveness tolerance in the group. In some embodiments, censoring for a given avatar does not account for the offensiveness tolerance of others in the area.

At step 712, control circuitry, in response to determining that the offensiveness rating of the first avatar exceeds the offensiveness tolerance of the second avatar, automatically censors one or more messages from the first avatar to the second avatar. Automatically censoring one or more messages may be performed by censoring verbal or text information. For example, the control circuitry may automatically censor verbal information by muting audio, decreasing volume of audio, and replacing audio (e.g., bleeping/alternative audio). The control circuitry may automatically censor text information may by automatically preventing the display of textual representation of a message or replacing text of a textual message with wildcards.

FIG. 8 is a flowchart 800 of a detailed illustrative process for identifying a first avatar in an XR environment based on a personalized list of bad actor avatars, in accordance with some embodiments of this disclosure. In various embodiments, the individual steps of process 800 may be implemented by one or more components of the devices and systems of FIGS. 1A, 1B, 1C, 5-6. Although the present disclosure may describe certain steps of process 800 (and of other processes described herein) as being implemented by certain components of the devices and systems of FIGS. 1A, 1B, 1C, 5-6, this is for purposes of illustration only, and it should be understood that other components of the devices and systems of FIGS. 1A, 1B, 1C, 5-6 may implement those steps instead.

At step 802, control circuitry (e.g., control circuitry 611, control circuitry 618, or control circuitry of any of devices 607, 608, or 610) compares identification data of the first avatar to entries of a personalized list of bad actor avatars (e.g., avatars identified as having bad behavior, being aggressive, being unfriendly, etc.) stored in the storage in association with the second avatar.

At step 804, control circuitry determines that the identification data of the first avatar matches an entry in the personalized list. The identification data of the first avatar may be a user ID that is a user handle, or a unique ID tied to the avatar (e.g., not tied to the user). The personalized list may be manually curated by the user of an avatar. The control circuitry may automatically curate the personalized list associated with an avatar based on observations of historical interactions (e.g., observing the bad actor avatar and the user's response to the bad actor avatar). The personalized list may be a combination of a manually curated list by the user of an avatar, and a list that was automatically curated by the control circuitry based on observations of historical interactions.

FIG. 9 is a flowchart 900 of a detailed illustrative process for identifying a first avatar in an XR environment based analyzing interaction data representing a statement or gesture made by the first avatar, in accordance with some embodiments of this disclosure. In various embodiments, the individual steps of process 900 may be implemented by one or more components of the devices and systems of FIGS. 1A, 1B, 1C, 5-6. Although the present disclosure may describe certain steps of process 900 (and of other processes described herein) as being implemented by certain components of the devices and systems of FIGS. 1A, 1B, 1C, 5-6, this is for purposes of illustration only, and it should be understood that other components of the devices and systems of FIGS. 1A, 1B, 1C, 5-6 may implement those steps instead.

At step 902, control circuitry (e.g., control circuitry 611, control circuitry 618, or control circuitry of any of devices 607, 608, or 610) analyzes interaction data representing a statement or gesture made by the first avatar in the XR environment. Interaction data may include audio data or text message of an avatar making a statement. Interaction data may include a gesture performed by an avatar.

At step 904, control circuitry determines that the interaction data includes use of abusive or aggressive language or gesture. The control circuitry may determine that the interaction data includes use of abusive or aggressive language or gesture by comparing the language or gesture to a language or gesture blocklist. The blocklist may be predefined, may be constantly updated, or may be edited by a user of an avatar. For example, a predefined language blocklist may include generally offensive words such as swear words, derogatory names, etc. A predefined gesture blocklist may include generally offensive gestures such as pointing, hitting, punching, flipping someone off, kicking, etc. The control circuitry may constantly update the blocklist by learning new words/gestures that are offensive based on feedback from other users/avatars of the XR world. A user of an avatar may edit the blocklist to include words or gestures that are specifically offensive to the user of the avatar. The blocklist may be a personalized blocklist of the user to only include words or gestures found offensive by the user.

FIG. 10 is a flowchart 1000 of a detailed illustrative process for identifying a first avatar in an XR environment based on interaction data representing a reaction of another avatar to a statement or gesture made by the first avatar, in accordance with some embodiments of this disclosure. In various embodiments, the individual steps of process 1000 may be implemented by one or more components of the devices and systems of FIGS. 1A, 1B, 1C, 5-6. Although the present disclosure may describe certain steps of process 1000 (and of other processes described herein) as being implemented by certain components of the devices and systems of FIGS. 1A, 1B, 1C, 5-6, this is for purposes of illustration only, and it should be understood that other components of the devices and systems of FIGS. 1A, 1B, 1C, 5-6 may implement those steps instead.

At step 1002, control circuitry (e.g., control circuitry 611, control circuitry 618, or control circuitry of any of devices 607, 608, or 610) analyzes interaction data representing a reaction of another avatar to a statement or gesture made by the first avatar in the XR environment.

At step 1004, control circuitry determines that the interaction data indicates the first avatar used abusive or aggressive language or gesture. In one aspect, the control circuitry may analyze the interaction data by using natural language processing for verbal statement analysis. The system may analyze the interaction data by using gesture analysis.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying a first avatar in an extended reality (XR) environment based on rule data stored in a storage; and
   in response to detecting that the first avatar has entered a portion of the XR environment at a communicable distance from a second avatar:
   determining an offensiveness rating of the first avatar;
   retrieving, from the storage, an offensiveness tolerance of the second avatar;
   comparing the offensiveness rating of the first avatar and offensiveness tolerance of the second avatar; and
   in response to determining, based on the comparing, that the offensiveness rating of the first avatar exceeds the offensiveness tolerance of the second avatar, automatically censoring one or more messages from the first avatar to the second avatar,
   wherein the identifying the first avatar comprises:
   comparing identification data of the first avatar to entries of a personalized list of bad actor avatars stored in the storage in association with the second avatar; and
   determining that the identification data of the first avatar matches an entry in the personalized list.

2. The method of claim 1, wherein the identifying the first avatar comprises:
   analyzing interaction data representing a statement or gesture made by the first avatar in the XR environment; and
   determining that the interaction data includes use of abusive or aggressive language or gesture.

3. The method of claim 2, wherein the interaction data is audio data, and the analyzing interaction data uses natural language processing for verbal statement analysis.

4. The method of claim 1, wherein the identifying the first avatar comprises:

analyzing interaction data representing a reaction of another avatar to a statement or action made by the first avatar in the XR environment; and determining that the interaction data indicates the first avatar used abusive or aggressive language or gesture.

5. The method of claim 4, wherein the interaction data is audio data, and the analyzing interaction data uses natural language processing for verbal statement analysis.

6. The method of claim 4, wherein the interaction data is gesture data, and the analyzing interaction data uses gesture analysis.

7. The method of claim 1, wherein the offensiveness tolerance is based on user input preference data stored in the storage in association with the second avatar.

8. The method of claim 1, wherein the communicable distance is based on user input preference data stored in the storage in association with the second avatar.

9. The method of claim 1, wherein the first avatar and the second avatar are in a zone of the XR environment, and the communicable distance is based on contextual data stored in the storage in association with the zone.

10. The method of claim 1, wherein the first avatar is one of a plurality of avatars for a first user ID and the second avatar is for a second user ID; and wherein the method further comprises automatically censoring one or more messages from any of the plurality of avatars for the first user ID to the second avatar for the second user ID in response to the determining that the offensiveness rating of the first avatar exceeds the offensiveness tolerance of the second avatar.

11. The method of claim 1, wherein the first avatar is one of a plurality of avatars for a first user ID; and wherein messages from others of the plurality of avatars for the first user ID are not automatically censored in response to the determining that the offensiveness rating of the first avatar exceeds the offensiveness tolerance of the second avatar.

12. The method of claim 1, wherein an offensiveness rating and an offensiveness tolerance is a letter grade or a score.

13. The method of claim 1, wherein automatically censoring comprises at least one of: automatically muting audio, automatically decreasing volume of audio, or automatically replacing audio with bleeping or alternative audio.

14. The method of claim 1, wherein automatically censoring comprises automatically replacing text of a textual message with wildcards.

15. The method of claim 1, wherein the portion of the XR environment includes multiple sub-portions, each sub-portion associated with a corresponding tolerance level, the method further comprising:
responsive to determining that the first avatar entered a first sub-portion corresponding to an outer zone within the portion, muting all audio from the first avatar without indicating that the first avatar is speaking; and
responsive to determining that the first avatar entered a second sub-portion corresponding to an inner zone within the portion, muting all audio from the first avatar while indicating that the first avatar is speaking.

16. The method of claim 1, wherein the in response to determining, based on the comparing, that the offensiveness rating of the first avatar exceeds the offensiveness tolerance of the second avatar, further comprises:
providing a first option for the second avatar to mute all audio from the first avatar without indicating that the first avatar is speaking, a second option for the second avatar to disappear the first avatar such that the second avatar no longer sees the first avatar, and a third option to move the first avatar to a region outside a personal boundary of the second avatar.

17. A system comprising:
control circuitry configured to:
identify a first avatar in an extended reality (XR) environment based on rule data stored in a storage; and
in response to detecting that the first avatar has entered a portion of the XR environment at a communicable distance from a second avatar:
determine an offensiveness rating of the first avatar;
retrieve, from the storage, an offensiveness tolerance of the second avatar;
compare the offensiveness rating of the first avatar and the offensiveness tolerance of the second avatar; and
in response to determining, based on the comparing, that the offensiveness rating of the first avatar exceeds the offensiveness tolerance of the second avatar, automatically censor one or more messages from a first device of the first avatar to a second device of the second avatar, wherein the second device is configured to provide the automatically censored one or more messages via an XR interface for the XR environment,
wherein the control circuitry is configured to identify the first avatar by:
comparing identification data of the first avatar to entries of a personalized list of bad actor avatars stored in the storage in association with the second avatar; and
determining that the identification data of the first avatar matches an entry in the personalized list.

18. The system of claim 17, wherein the first avatar is one of a plurality of avatars for a first user ID and the second avatar is one of one or more avatars for a second user ID, and the control circuitry is further configured to:
automatically censor messages from any of the plurality of avatars for the first user ID to any of the one or more avatars for the second user ID in response to the determining that the offensiveness rating of the first avatar exceeds the offensiveness tolerance of the second avatar.

19. The system of claim 17, wherein the portion of the XR environment includes multiple sub-portions, each sub-portion associated with a corresponding tolerance level, and the control circuitry further configured to:
responsive to determining that the first avatar entered a first sub-portion corresponding to an outer zone within the portion, mute all audio from the first avatar without indicating that first avatar is speaking; and
responsive to determining that the first avatar entered a second sub-portion corresponding to an inner zone within the portion, mute all audio from the first avatar while indicating that the first avatar is speaking.

20. The system of claim 17, wherein the second device is a virtual reality (VR) headset.

21. A method comprising:
comparing identification data of a first avatar to entries of a personalized list of bad actor avatars stored in a storage in association with a second avatar in an extended reality (XR) environment;
determining that the identification data of the first avatar matches an entry in the personalized list;
in response to detecting that the first avatar has entered a portion of the XR environment at a communicable distance from the second avatar:

determining an offensiveness rating of the first avatar;
retrieving, from the storage, an offensiveness tolerance of the second avatar;
comparing the offensiveness rating of the first avatar and offensiveness tolerance of the second avatar; and
in response to determining, based on the comparing, that the offensiveness rating of the first avatar exceeds the offensiveness tolerance of the second avatar, automatically censoring one or more messages from the first avatar to the second avatar.

* * * * *